United States Patent
Jin et al.

(10) Patent No.: US 10,186,045 B2
(45) Date of Patent: Jan. 22, 2019

(54) METHODS OF AND APPARATUSES FOR RECOGNIZING MOTION OF OBJECTS, AND ASSOCIATED SYSTEMS

(71) Applicant: Samsung Electronics Co., Ltd., Suwon-si, Gyeonggi-do (KR)

(72) Inventors: Young-Gu Jin, Osan-si (KR); Jung-Seop Kim, Seoul (KR); Dong-Wook Kwon, Suwon-si (KR); Kyung-Il Kim, Anyang-si (KR); Min-Ho Kim, Hwaseong-si (KR); Gi-Sang Lee, Hwaseong-si (KR); Sang-Bo Lee, Yongin-si (KR); Jin-Kyung Lee, Suwon-si (KR); Jin-Wuk Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/636,751

(22) Filed: Jun. 29, 2017

(65) Prior Publication Data

US 2017/0372486 A1    Dec. 28, 2017

Related U.S. Application Data

(63) Continuation of application No. 14/064,639, filed on Oct. 28, 2013, now Pat. No. 9,715,740.

(30) Foreign Application Priority Data

Oct. 30, 2012    (KR) .................. 10-2012-0120883

(51) Int. Cl.
G06T 7/254    (2017.01)

(52) U.S. Cl.
CPC ..... *G06T 7/254* (2017.01); *G06T 2207/10016* (2013.01); *G06T 2207/10024* (2013.01);
(Continued)

(58) Field of Classification Search
CPC .......... G06T 7/254; G06T 2207/30232; G06T 2207/10024; G06T 2207/10016; G06T 2207/30241; G06T 2207/10028
(Continued)

(56) References Cited

U.S. PATENT DOCUMENTS 7,372,977 B2    5/2008   Fujimura et al.
7,831,087 B2   11/2010   Harville
(Continued)

FOREIGN PATENT DOCUMENTS

CN    101996401 A    3/2011
CN    102087738 A    6/2011
(Continued)

OTHER PUBLICATIONS

Office Action for Chinese Patent Application No. 201310526434.0 dated Dec. 11, 2017.
(Continued)

*Primary Examiner* — Amandeep Saini
(74) *Attorney, Agent, or Firm* — Harness, Dickey & Pierce, P.L.C.

(57) ABSTRACT

A method of recognizing motion of an object may include periodically obtaining depth data of a first resolution and two-dimensional data of a second resolution with respect to a scene using an image capturing device, wherein the second resolution is higher than the first resolution; determining a motion tracking region by recognizing a target object in the scene based on the depth data, such that the motion tracking region corresponds to a portion of a frame and the portion includes the target object; periodically obtaining tracking region data of the second resolution corresponding to the motion tracking region; and/or analyzing the motion of the target object based on the tracking region data.

20 Claims, 31 Drawing Sheets

(52) U.S. Cl.
CPC ............... *G06T 2207/10028* (2013.01); *G06T 2207/30232* (2013.01); *G06T 2207/30241* (2013.01)

(58) Field of Classification Search
USPC ........................................................ 382/103
See application file for complete search history.

(56) References Cited

U.S. PATENT DOCUMENTS

| | | |
|---|---|---|
| 8,253,733 B2 | 8/2012 | Kim et al. |
| 8,744,168 B2 | 6/2014 | Chen |
| 8,988,432 B2 | 3/2015 | Mathe et al. |
| 2003/0179294 A1 | 9/2003 | Martins |
| 2009/0244309 A1 | 10/2009 | Maison et al. |
| 2009/0290811 A1 | 11/2009 | Imai |
| 2011/0081043 A1* | 4/2011 | Sabol ..................... G06T 7/254 382/103 |
| 2011/0211754 A1 | 9/2011 | Litvak et al. |
| 2011/0242339 A1 | 10/2011 | Ogawa |
| 2011/0293137 A1 | 12/2011 | Gurman et al. |
| 2012/0070070 A1 | 3/2012 | Litvak |
| 2012/0087572 A1 | 4/2012 | Dedeoglu et al. |
| 2012/0120073 A1 | 5/2012 | Haker et al. |
| 2012/0128201 A1 | 5/2012 | Brickhill |
| 2012/0169848 A1* | 7/2012 | Bae ....................... G01S 7/4861 348/46 |
| 2013/0182904 A1* | 7/2013 | Zhang ..................... H04N 7/18 382/103 |

FOREIGN PATENT DOCUMENTS

| | | |
|---|---|---|
| CN | 102208110 A | 10/2011 |
| CN | 102509074 A | 6/2012 |
| JP | 2010205031 A | 9/2010 |
| KR | 20100050838 A | 5/2010 |

OTHER PUBLICATIONS

U.S. Appl. No. 14/064,639, filed Oct. 28, 2013.
Office Action for Korean Patent Application No. 10-2012-0120883 dated May 8, 2018.

* cited by examiner

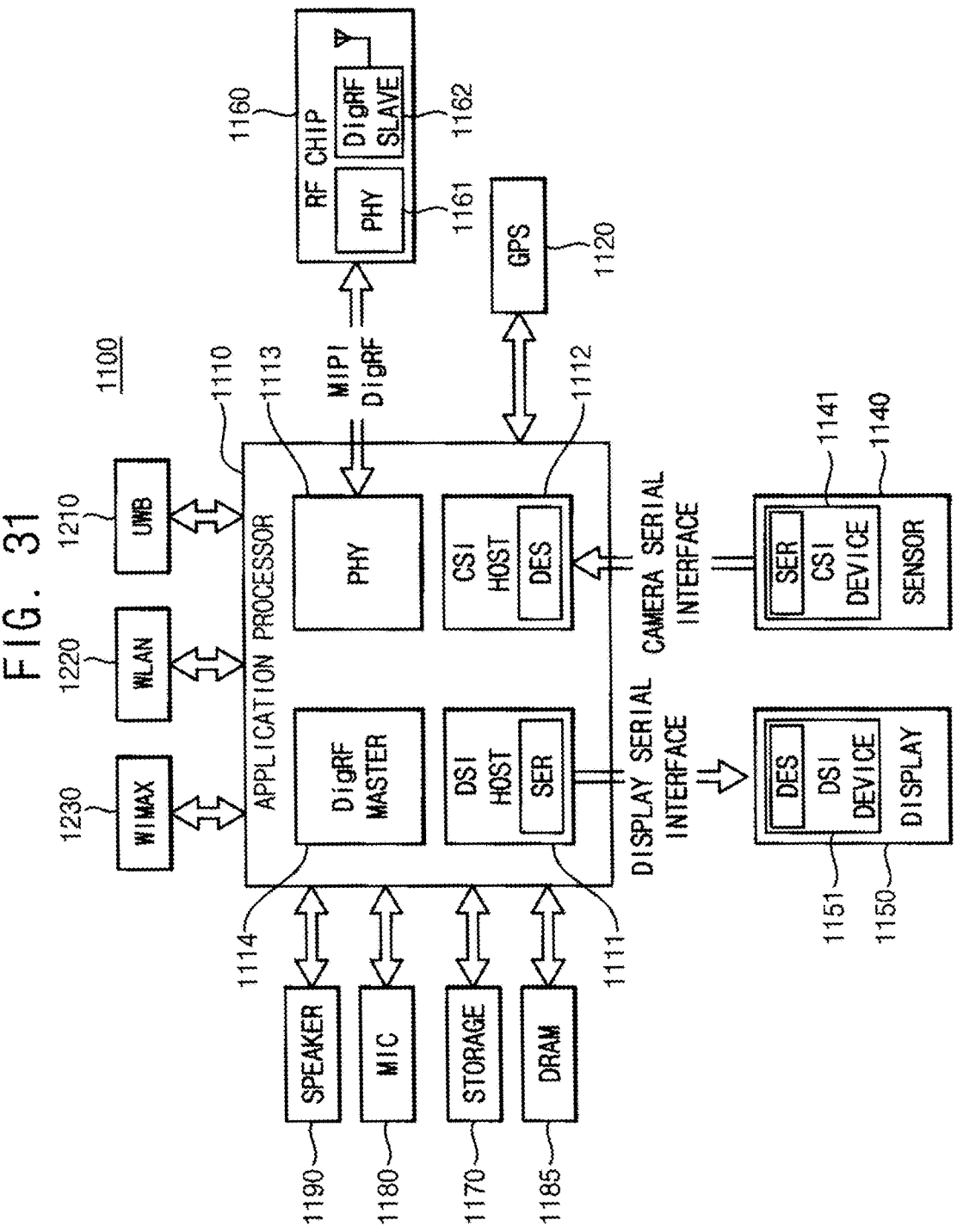

METHODS OF AND APPARATUSES FOR RECOGNIZING MOTION OF OBJECTS, AND ASSOCIATED SYSTEMS

CROSS-REFERENCE TO RELATED APPLICATION(S)

This application is a continuation of U.S. application Ser. No. 14/064,639, filed on Oct. 28, 2013, which claims priority from Korean Patent Application No. 10-2012-0120883, filed on Oct. 30, 2012, in the Korean Intellectual Property Office (KIPO), the entire contents of each of which are incorporated herein by reference.

BACKGROUND

1. Field

Some example embodiments may relate generally to processing of image data. Some example embodiments may relate to methods of and/or apparatuses for recognizing motion of objects based on depth data and/or two-dimensional data.

2. Description of Related Art

A two-dimensional image sensor may be used to obtain two-dimensional data and the two-dimensional data may be used to recognize a shape and/or a motion of an object. Particularly the technology for recognizing the motion of a user is developed to support a user interface. The two-dimensional data for the motion recognition may include color image data or black and white image data.

Alternatively a depth sensor may be used to obtain depth data and the depth data may be used to recognize the shape and/or the motion of the object. The depth data for the motion recognition may include information of a distance to the object from the sensor.

In general, the two-dimensional data may be provided with relatively a higher resolution, but it is difficult to distinguish the object from the background based on the two-dimensional data during the data process for the motion recognition. The depth data may be provided with relatively a lower resolution and thus it is difficult to discern the complex shape of the object based on the depth data during the data process for the motion recognition.

SUMMARY

Some example embodiments of the inventive concept may provide methods of recognizing motion of objects, capable of discerning the motion of the objects efficiently based on depth data and/or two-dimensional data.

Some example embodiments of the inventive concept may provide apparatuses for recognizing motion of objects, capable of discerning the motion of the objects efficiently based on depth data and/or two-dimensional data.

Some example embodiments of the inventive concept may provide systems adopting the methods and/or apparatuses of recognizing the motion of the objects.

In some example embodiments, a method of recognizing motion of an object may comprise periodically obtaining depth data of a first resolution and two-dimensional data of a second resolution with respect to a scene using an image capturing device, wherein the second resolution is higher than the first resolution; determining a motion tracking region by recognizing a target object in the scene based on the depth data, such that the motion tracking region corresponds to a portion of a frame and the portion includes the target object; periodically obtaining tracking region data of the second resolution corresponding to the motion tracking region; and/or analyzing the motion of the target object based on the tracking region data.

In some example embodiments, periodically obtaining the depth data and the two-dimensional data may comprise providing the depth data corresponding to the frame with a first frame period using depth pixels of the first resolution; and/or providing the two-dimensional data corresponding to the frame with a second frame period using color pixels of the second resolution.

In some example embodiments, the method may further comprise synchronizing the depth data and the two-dimensional data to be matched with each other, when the first frame period is different from the second frame period.

In some example embodiments, the tracking region data corresponding to the motion tracking region may be provided with the first frame period or the second frame period.

In some example embodiments, periodically obtaining the tracking region data of the second resolution may comprise extracting region image data of the second resolution corresponding to the motion tracking region from the two-dimensional data of the second resolution corresponding to the frame; and/or providing the region image data of the second resolution as the tracking region data.

In some example embodiments, periodically obtaining the tracking region data of the second resolution may comprise extracting region depth data of the first resolution corresponding to the motion tracking region from the depth data of the first resolution corresponding to the frame; extracting region image data of the second resolution corresponding to the motion tracking region from the two-dimensional data of the second resolution corresponding to the frame; compensating for the region depth data of the first resolution using the region image data of the second resolution to generate region depth data of the second resolution; and/or providing the region depth data of the second resolution as the tracking region data.

In some example embodiments, the depth pixels and the color pixels may be arranged in a common pixel array.

In some example embodiments, the depth pixels and the color pixels may be arranged respectively in distinct pixel arrays that are spaced apart from each other.

In some example embodiments, periodically obtaining the depth data and the two-dimensional data may comprise periodically providing raw data corresponding to the frame using time-of-flight (TOF) depth pixels, the TOF depth pixels operating in response to a plurality of demodulation signals having different phases from each other; and/or calculating the depth data of the first resolution and the two-dimensional data of the second resolution based on the raw data.

In some example embodiments, calculating the depth data of the first resolution and the two-dimensional data of the second resolution may comprise providing the depth data of the first resolution by combining every M bits of the raw data, where M is a positive integer equal to or greater than two and/or providing the two-dimensional data of the second resolution by combining every N bits of the raw data, where N is a positive integer equal to or smaller than M.

In some example embodiments, the demodulation signals may have phase difference of 0, 90, 180 and 270 degrees, respectively, with respect to transmission light radiated from the image capturing device.

In some example embodiments, providing the depth data of the first resolution may comprise providing one bit value of the depth data based on four bit values of the raw data, the four bit values respectively corresponding to the four demodulation signals having the phase difference of 0, 90, 180 and 270 degrees, respectively.

In some example embodiments, providing the two-dimensional data of the second resolution may comprise providing one bit value of the two-dimensional data by summing two bit values of the raw data, the two bit values respectively corresponding to the two demodulation signals having the phase differences of 0 and 180 degrees; and/or providing another bit value of the two-dimensional data by summing other two bit values of the raw data, the other two bit values respectively corresponding to the two demodulation signals having the phase differences of 90 and 270 degrees.

In some example embodiments, periodically obtaining the tracking region data of the second resolution may comprise extracting region depth data of the first resolution corresponding to the motion tracking region from the depth data of the first resolution corresponding to the frame; extracting region image data of the second resolution corresponding to the motion tracking region from the two-dimensional data of the second resolution corresponding to the frame; compensating for the region depth data of the first resolution using the region image data of the second resolution to generate region depth data of the second resolution; and/or providing the region depth data of the second resolution as the tracking region data.

In some example embodiments, determining the motion tracking region may comprise determining coordinates of a center point of the motion tracking region in the frame; and/or determining a size of the motion tracking region in the frame.

In some example embodiments, the method may further comprise upgrading the motion tracking region according to the motion of the target object.

In some example embodiments, upgrading the motion tracking region may comprise detecting a change of a position of the target object in the scene based on the depth data and/or changing coordinates of a center point of the motion tracking region in the frame based on the change of the position of the target object in the scene.

In some example embodiments, upgrading the motion tracking region may comprise detecting a change of distance to the target object based on the depth data; decreasing a size of the motion tracking region when the distance to the target object increases; and/or increasing the size of the motion tracking region when the distance to the target object decreases.

In some example embodiments, an apparatus for recognizing motion of an object may comprise an image capturing device configured to periodically provide depth data of a first resolution and two-dimensional data of a second resolution with respect to a scene, wherein the second resolution is higher than the first resolution; a motion region tracker configured to determine a motion tracking region by recognizing a target object in the scene based on the depth data, such that the motion tracking region corresponds to a portion of a frame and the portion includes the target object, and configured to periodically provide tracking region data of the second resolution corresponding to the motion tracking region; and/or a motion analyzer configured to analyze the motion of the target object based on the tracking region data.

In some example embodiments, the image capturing device may comprise a pixel array in which depth pixels of the first resolution and color pixels of the second resolution are alternatively arranged, the depth pixels providing the depth data with a first frame period, and the color pixels providing the two-dimensional data with a second frame period.

In some example embodiments, the image capturing device may comprise a first pixel array in which depth pixels of the first resolution are arranged, the depth pixels providing the depth data with a first frame period; and/or a second pixel array in which color pixels of the second resolution are arranged, the color pixels providing the two-dimensional data with a second frame period.

In some example embodiments, the image capturing device may comprise a pixel array in which time-of-flight (TOF) depth pixels are arranged, the TOF depth pixels operating in response to a plurality of demodulation signals having different phases from each other to periodically provide raw data corresponding to the frame.

In some example embodiments, the demodulation signals may have phase difference of 0, 90, 180, and 270 degrees, respectively, with respect to transmission light radiated from the image capturing device, and/or one bit value of the depth data may be provided based on four bit values of the raw data, the four bit values respectively corresponding to the four demodulation signals having the phase difference of 0, 90, 180, and 270 degrees, respectively.

In some example embodiments, a system may comprise an image capturing device configured to periodically provide depth data of a first resolution corresponding to a frame of a scene and two-dimensional data of a second resolution corresponding to the frame, wherein the second resolution is higher than the first resolution; a motion region tracker configured to determine a motion tracking region by recognizing a target object in the scene based on the depth data, such that the motion tracking region corresponds to a portion of the frame and the portion includes the target object, and configured to periodically provide tracking region data of the second resolution corresponding to the motion tracking region; a motion analyzer configured to analyze motion of the target object based on the tracking region data; and/or a control device configured to generate an event corresponding to the motion of the target object based on an analysis result of the motion analyzer.

In some example embodiments, the system may be a user interface system that operates by recognizing motion of a user. The target object may include a body of the user or a portion of the body of the user.

In some example embodiments, an apparatus for recognizing motion of an object may comprise a first device configured to provide depth data for a scene that includes the object at a first resolution and two-dimensional data for the scene at a second resolution; a second device configured to determine a motion tracking region by recognizing the object based on the depth data and configured to provide tracking region data of the second resolution corresponding to the motion tracking region; and/or a third device configured to analyze the motion of the object based on the tracking region data. The second resolution may be higher than the first resolution. The motion tracking region may correspond to a portion of a frame. The portion of the frame may include the object.

In some example embodiments, the first device may comprise a sensing unit. The sensing unit may comprise a depth pixel array. The depth pixel array may be configured to output depth information.

In some example embodiments, the first device may comprise a sensing unit. The sensing unit may comprise a color pixel array. The color pixel array may be configured to output color information.

In some example embodiments, the first device may comprise a sensing unit. The sensing unit may comprise a depth pixel array and a color pixel array. The depth pixel array may be configured to output depth information. The color pixel array may be configured to output color information.

In some example embodiments, the first device may comprise a sensing unit. The sensing unit may comprise a pixel array. The pixel array may be configured to output depth information, color information, or depth and color information.

In some example embodiments, a method for recognizing motion of an object may comprise obtaining depth data of a first resolution with respect to a scene; obtaining two-dimensional data of a second resolution with respect to the scene; recognizing the object in the scene based on the depth data; tracking the object using a motion tracking region to provide tracking region data of the second resolution; and/or analyzing the motion of the object based on the tracking region data. The second resolution may be higher than the first resolution.

In some example embodiments, obtaining the depth data of the first resolution may comprise using a depth pixel array of a sensing unit to output depth information.

In some example embodiments, obtaining the two-dimensional data of the second resolution may comprise using a color pixel array of a sensing unit to output color information.

In some example embodiments, obtaining the depth data of the first resolution may comprise using a depth pixel array of a sensing unit to output depth information and/or obtaining the two-dimensional data of the second resolution may comprise using a color pixel array of the sensing unit to output color information.

In some example embodiments, obtaining the depth data of the first resolution may comprise using a pixel array of a sensing unit to output depth information and/or obtaining the two-dimensional data of the second resolution may comprise using the pixel array of the sensing unit to output color information.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIGS. 11A and 11B are diagrams illustrating example pixel arrays in the sensing unit of FIG. 10;

FIG. 31 illustrates a block diagram of interface employable in the computing system of FIG. 30 according to some example embodiments of the inventive concept.

DETAILED DESCRIPTION

Figure 1:
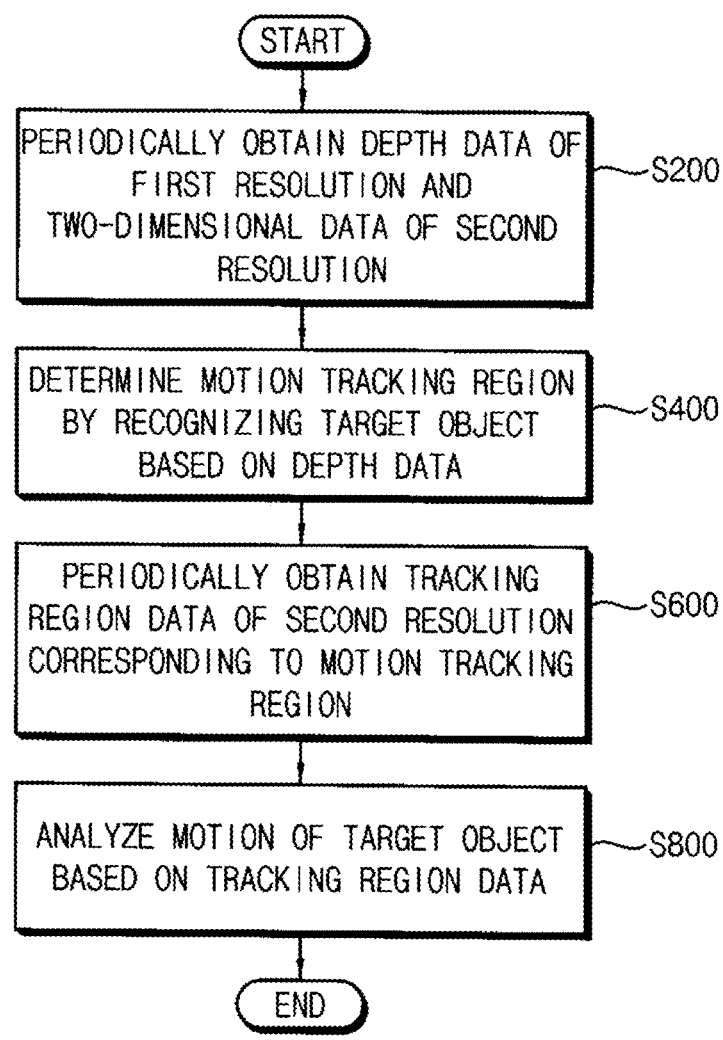
FIG. 1 is a flowchart illustrating a method of recognizing a motion of an object according to some example embodiments of the inventive concept.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a flowchart illustrating a method of recognizing a motion of an object according to some example embodiments of the inventive concept.

Referring to FIG. 1, depth data ZDATA of a first resolution RES1 and two-dimensional data CDATA of a second resolution RES2 are obtained with respect to a scene or a sequence of scenes using an image capturing device (S200). The second resolution RES2 is higher than the first resolution RES1. For example, the first resolution RES1 may be the quarter video graphic array (QVGA) resolution of 320*240 pixels or a lower resolution than the QVGA resolution. The second resolution RES2 may be the high density (HD) resolution of 1280*720 pixels or a higher resolution than the HD resolution.

The depth data ZDATA represent the depth information or the distance information of the scene captured by the image capturing device, and the two-dimensional data CDATA represent the image information of the scene. The depth data ZDATA may be provided in a form of a depth map in which the distance information of the respective portions of the scene is represented by unit of pixel. The two-dimensional data CDATA may represent the color image or the black and white image of the scene.

The depth data ZDATA and the two-dimensional data CDATA may be provided periodically by unit of frame. A first frame period corresponding to a time interval between the frames of the depth data ZDATA may be equal to or different from a second frame period corresponding to a time interval between the frames of the two-dimensional data CDATA. For example, the frame rate of the depth data ZDATA may be 15 through 30 frames per second (fps), and the frame rate of the two-dimensional data CDATA may be 30 through 60 fps.

The scene may include a fixed background and a target object moving in the background. A motion tracking region MTR is determined by recognizing the target object in the scene based on the depth data ZDATA (S400). The motion tracking region MTR corresponds to a portion of the frame and the portion includes the target object. The recognition of the target object may be performed based on the depth data corresponding to a few frames that are sequentially captured.

The target object may be an independent thing such as a ball, a human body, etc. or a portion of the independent thing such as a hand, an arm, a head, etc. The recognition of the target object may be performed on various criteria according to the kind of the captured scene. For example, when the scene includes a plurality of moving objects, at least one target object may be determined based on the kind, the distance, the speed of the objects, etc. In some example embodiments, a simple three-dimensional recognition algorithm may be used to determine the target object based on the depth data ZDATA. The motion tracking region MTR may be determined based on such recognition of the target object. In general, the target object corresponds to a portion of the scene, and thus the motion tracking region MTR corresponds to a portion of the entire frame.

After the motion tracking region MTR is determined, tracking region data TRDATA of the second resolution RES2 corresponding to the motion tracking region MTR are obtained periodically (S600). Some example embodiments of providing the tracking region data TRDATA will be further described below. The amount of the tracking region data is less than the data amount of the frame because the motion tracking region corresponds to a portion of the frame. As the size of the motion tracking region MTR to the size of the frame is decreased, the amount of the tracking region data TRDATA may be reduced significantly.

A motion of the target object is analyzed based on the tracking region data TRDATA (S800). The motion analysis may be performed by various methods known to those skilled in the art. However, compared with the conventional methods of analyzing the motion based on the data corresponding to the entire frame, the motion analysis according to some example embodiments may be based on the tracking region data TRDATA of the reduced amount and relatively the higher resolution, that is, the second resolution RES2.

As such, according to the method of recognizing the motion of some example embodiments, the target object may be discerned using the depth data ZDATA of the lower first resolution RES1, then the kind, the shape, and/or the motion of the target object may be analyzed using the tracking region data TRDATA of the higher second resolution RES2, and thus the motion of the target object may be better recognized. In addition, the data transfer and calculation amount for the motion recognition may be reduced because the motion of the target object may be analyzed based on the tracking region data TRDATA of the motion tracking region MTR corresponding to a portion of an entire frame.

Figure 2:
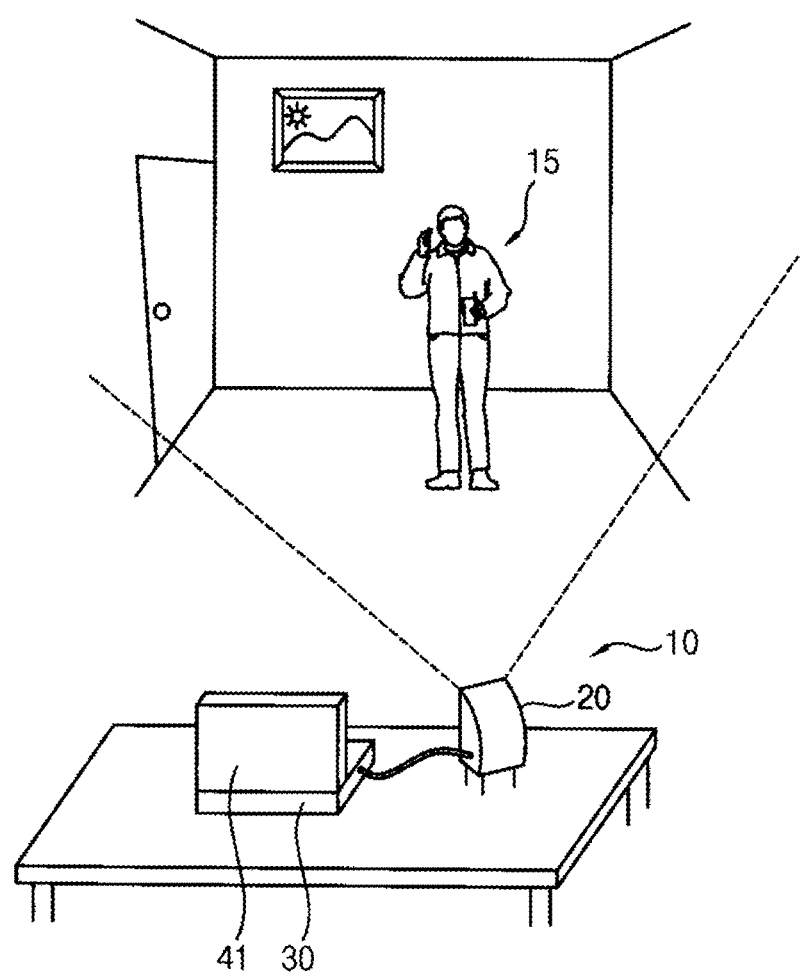
FIG. 2 is a diagram illustrating an example of using a system according to some example embodiments of the inventive concept.
Figure 3:
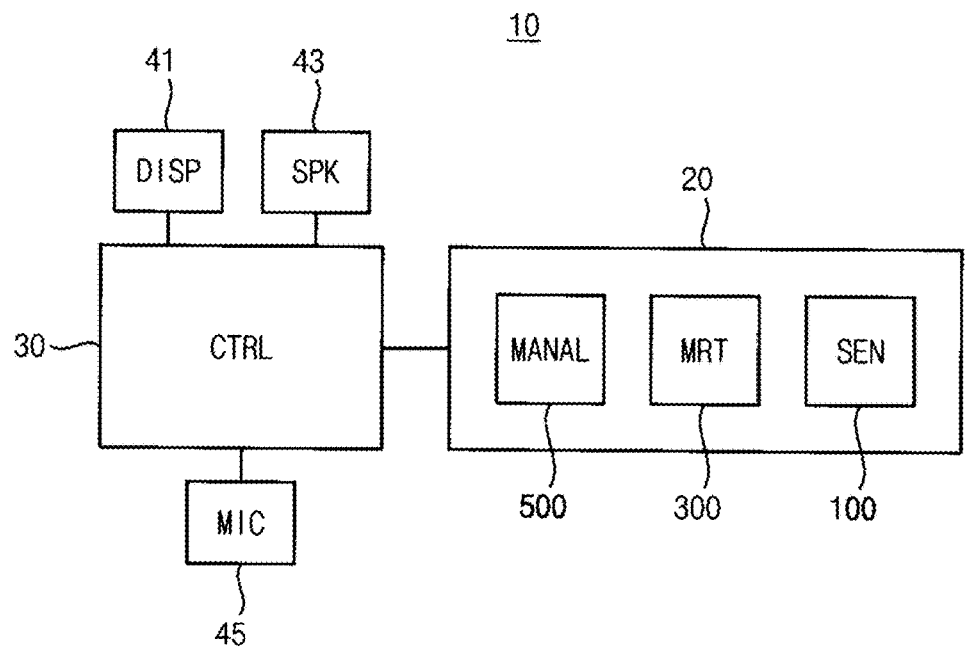
FIG. 3 is a block diagram illustrating a system according to some example embodiments of the inventive concept.

FIG. 2 is a diagram illustrating an example of using a system according to some example embodiments of the inventive concept, and FIG. 3 is a block diagram illustrating a system according to some example embodiments of the inventive concept.

As illustrated in FIG. 2, a system 10 may be a user interface system that operates by recognizing a motion of a user 15. The above-mentioned target object may include a body of the user 15 or a portion of the body such as a hand, an arm, a head, a torso, etc. of the user 15.

Referring to FIGS. 2 and 3, the system 10 may include a motion recognizing device 20 and a control device 30. The components for the user interface such as a display device (DISP) 41, a speaker (SPK) 43, a microphone (MIC) 45, etc., may be distinct from and coupled to the control device 30 or may be formed as integral portions of the control device 30. The control device 30 may be an arbitrary device including a memory and a processor. For example, the control device 30 may be a notebook computer, a laptop computer, a television set, a game console, etc.

The motion recognizing device 20 may include an image capturing device (SEN) 100, a motion region tracker 300, and a motion analyzer (MANAL) 500. The image capturing device 100 may be implemented with an image capturing device distinct from the other components.

At least a portion of the motion region tracker 300 and the motion analyzer 500 may be implemented with software. In this case, the software may be implemented with program codes that may be executed by a general purpose processor or an application processor. The program codes may be implemented in a form of sub-routine that may be called and executed by a main program. According to some example embodiments, the motion analyzer 500 may be included in the control device 30, or the motion region tracker 300 and the motion analyzer 500 may be included in the control device 30.

As described with reference to FIG. 1, the image capturing device 100 obtains and provides the depth data ZDATA of the first resolution RES1 and the two-dimensional data CDATA of the second resolution RES2 periodically with respect to the scene the second resolution RES1 is higher than the first resolution RES1 (S200). The motion region tracker 300 determines the motion tracking region MTR by recognizing the target object in the scene corresponding to the frame based on the depth data ZDATA (S400), such that the motion tracking region MTR corresponds to a portion of the frame and the portion includes the target object. In addition, the motion region tracker 300 periodically obtains and provides the tracking region data TRDATA of the second resolution RES2 corresponding to the motion tracking region MTR (S600). The motion analyzer 500 analyzes the motion of the target object based on the tracking region data TRDATA of the second resolution RES2 (S800).

Some example embodiments of the image capturing device 100 and the motion region tracker are further described with reference to FIGS. 4 through 28B. The motion analyzer 500 may be implemented variously as known to those skilled in the art, but it performs the motion recognition not based on the data corresponding to the entire frame but based on the tracking region data TRDATA corresponding to the motion tracking region MTR.

The control device 30 generates an event corresponding to the motion of the target object based on an analysis result of the motion analyzer 500. The event may be transferred to the user through the display device 41 and/or the speaker 43. For example, a display image corresponding to the analyzed motion may be provided to the user through the display device 41 and/or the sound corresponding to the analyzed motion may be provided to the user through the speaker 43.

Figure 4:
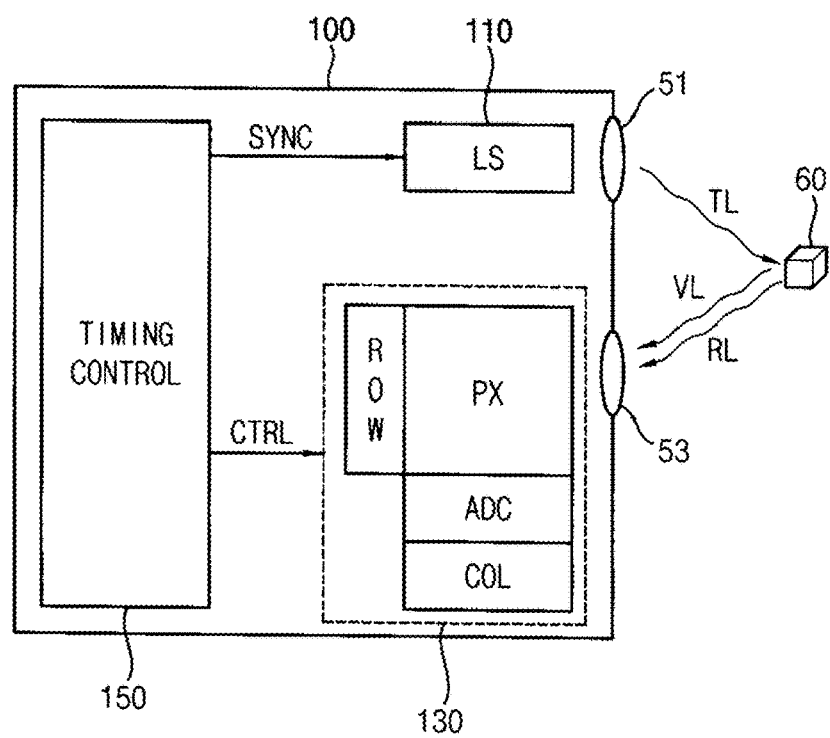
FIG. 4 is a block diagram illustrating an example of an image capturing device in a motion recognizing device according to some example embodiments of the inventive concept.

FIG. 4 is a block diagram illustrating an example of an image capturing device in a motion recognizing device according to some example embodiments of the inventive concept.

Referring to FIG. 4, the image capturing device 100 may include a light source (LS) 110, a sensing unit 130, and a control unit 150. The light source 110 generates a modulated transmission light TL to illuminate an object with the modulated transmission light TL. The control unit 150 generates control signals SYNC and CTRL to control operations of the light source 110 and the sensing unit 130. The sensing unit 130 may include depth pixels that convert reception light RL to electrical signals. In addition, the sensing unit 130 may include color pixels that convert visible light VL to electrical signals.

The light source 110 may emit the modulated transmission light TL having a given, desired, or predetermined wavelength. For example, the light source 110 may emit infrared light or near-infrared light. The transmission light TL generated by the light source 110 may be focused on the object 60 by a lens 51. Modulated transmission light TL may reflect from the object 60 to lens 53 as reception light RL and visible light VL.

The light source 110 may be controlled by the control signal SYNC to output the modulated transmission light TL such that the intensity of the modulated transmission light TL periodically changes. For example, the light source 110 may be implemented with a light emitting diode (LED), a laser diode, or the like.

The control signal SYNC from the control unit 150 may include a reset signal RS and a transfer control signal TG, as will be described with reference to FIGS. 12A through 12D, and demodulation signals TG1 through TG4 as will be described with reference to FIGS. 24 and 25. The control signal SYNC provided to the light source 110 may include a signal to synchronize the modulated transmission light TL and the demodulation signals TG1 through TG4.

The sensing unit 130 may include a pixel array PX in which depth pixels and/or color pixels are arranged. Also the sensing unit 130 may include an analog-to-digital converting unit ADC and selection circuits ROW and COL to select a particular pixel in the pixel array PX.

In some example embodiments, the image capturing device 100 may be a three-dimensional image sensor including the depth pixels for providing distance information and the color pixels for providing image information. In this case, the sensing unit 130 may include a pixel array PX_CZ in which a plurality of depth pixels and a plurality of color pixels are alternatively arranged as will be described with reference to FIG. 6.

In some example embodiments, the image capturing device 100 may include a depth sensor and a two-dimensional image sensor distinct from each other. In this case, the sensing unit 130 may include a pixel array PX_C in which a plurality of color pixels are arranged and a pixel array PX_Z in which a plurality of depth pixels are arranged as will be described with reference to FIGS. 11A and 11B.

In some example embodiments, the image capturing device 100 may include only a depth sensor. In this case, the sensing unit 130 may include a pixel array PX_Z in which a plurality of depth pixels are arranged as will be described with reference to FIG. 23.

In some example embodiments, the analog-to-digital converting unit ADC may perform column analog-to-digital conversion that converts analog signals in parallel using a plurality of analog-to-digital converters respectively coupled to a plurality of column lines, or may perform single analog-to-digital conversion that converts the analog signals in series using a single analog-to-digital converter.

In some example embodiments, the analog-to-digital converting unit ADC may include a correlated double sampling (CDS) unit for extracting an effective signal component (the valid voltage) based on the voltages sampled by the pixels.

In some example embodiments, the CDS unit may perform analog double sampling (ADS) that extracts the effective signal component based on an analog reset signal that represents a reset component and an analog data signal that represents a signal component.

In some example embodiments, the CDS unit may perform digital double sampling (DDS) that converts the analog reset signal and the analog data signal into two digital signals to extract as the effective signal component a difference between the two digital signals.

In some example embodiments, the CDS unit may perform dual correlated double sampling that performs both of analog double sampling and digital double sampling.

Figure 5:
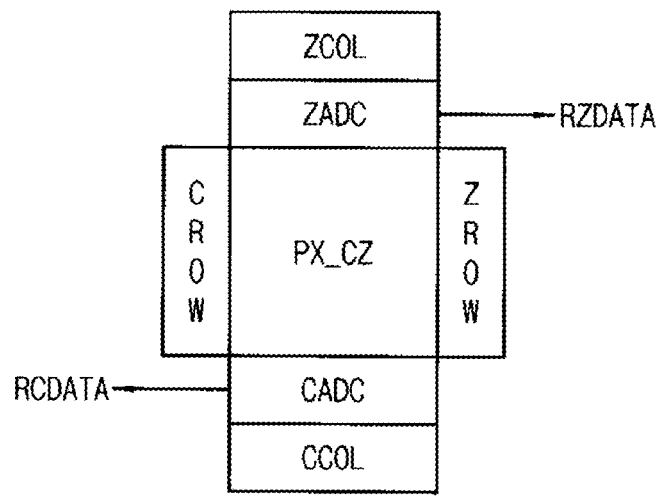
FIG. 5 is a diagram illustrating an example of a sensing unit in the image capturing device of FIG. 4.

FIG. 5 is a diagram illustrating an example of a sensing unit in the image capturing device of FIG. 4. FIG. 5 illustrates an example embodiment of a sensing unit 130a in a case where the image capturing device 100 of FIG. 4 is a three-dimensional image sensor.

Referring to FIG. 5, the sensing unit 130a may include a pixel array PX_CZ where a plurality of color pixels and a plurality of depth pixels are arranged, a color pixel select circuit CROW and CCOL, a depth pixel select circuit ZROW and ZCOL, a color pixel converter CADC, and a depth pixel converter ZADC. The color pixel select circuit CROW and CCOL and the color pixel converter CADC may provide color information RCDATA by controlling the color pixels included in the pixel array PX_CZ, and the depth pixel select circuit ZROW and ZCOL and the depth pixel converter ZADC may provide depth information RZDATA by controlling the depth pixels included in the pixel array PX_CZ.

The color information RCDATA and the depth information RZDATA from the sensing unit 130a may be raw data and the above-described two-dimensional data CDATA and the depth data ZDATA may be provided based on the raw data. In the three-dimensional image sensor as illustrated in FIG. 5, components for controlling the color pixels and components for controlling the depth pixels may independently operate to provide the color information RCDATA and the depth information RZDATA of the captured image.

Figure 6:
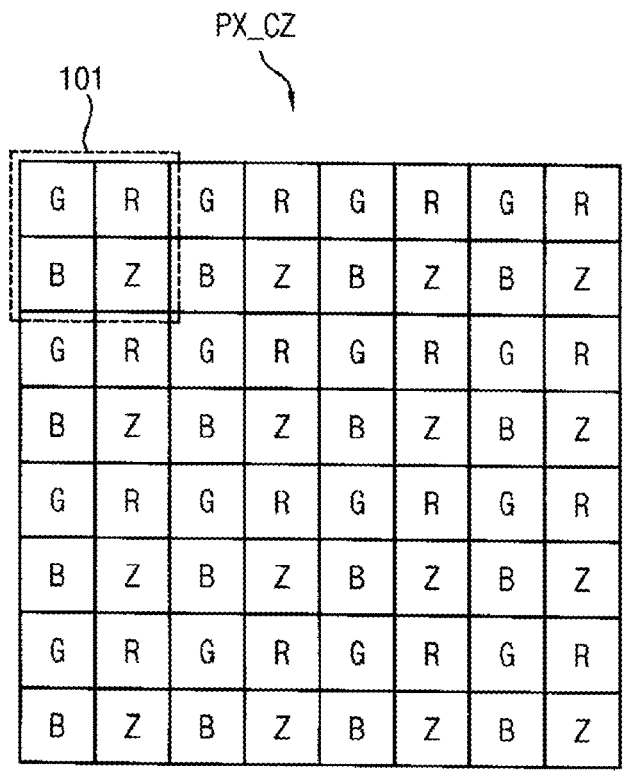
FIG. 6 is a diagram illustrating an example of a pixel array in the sensing unit of FIG. 5.

FIG. 6 is a diagram illustrating an example of a pixel array in the sensing unit of FIG. 5.

Referring to FIG. 6, the pixel array PX_CZ may include the color pixels R, G, and B for providing the image information and the depth pixels Z for providing the depth information. For example, the pixel pattern 101 including the red pixel R, the green pixel G, the blue pixel B, and the depth pixel Z may be repeatedly arranged in the pixel array PX_CZ.

Each of the color pixels R, G, and B may include a photo-detection region for collecting photo-electrons generated by the incident visible light, and the depth pixel Z may include a photo-detection region for collecting photo-electrons generated by the reception light RL, that is, the incident infrared light or near-infrared light. For example, to enhance quantum efficiency, the depth pixel Z may include a photodiode formed deeper than that of the color pixels R, G, and B since the infrared light has a longer wavelength than that of the visible light.

Color filters may be formed over the color pixels R, G, and B and infrared light pass filters may be formed over the depth pixels Z. For example, the red pixel R may be defined by the red filter, the green pixel G may be defined by the green filter, the blue pixel B may be defined by the blue filter, and the depth pixel Z may be defined by the infrared light pass filter. In addition, infrared light cut filters may be further formed over the color pixels R, G, and B.

FIG. 6 illustrates a non-limiting example of the pixel pattern 101, and the pixel pattern 101 may be changed variously. For example, the area ratio of the one color pixel and the one depth pixel may be changed variously and/or the number ratio of the color pixels and the depth pixels in the pixel array PX_CZ may be changed variously.

Figure 7:
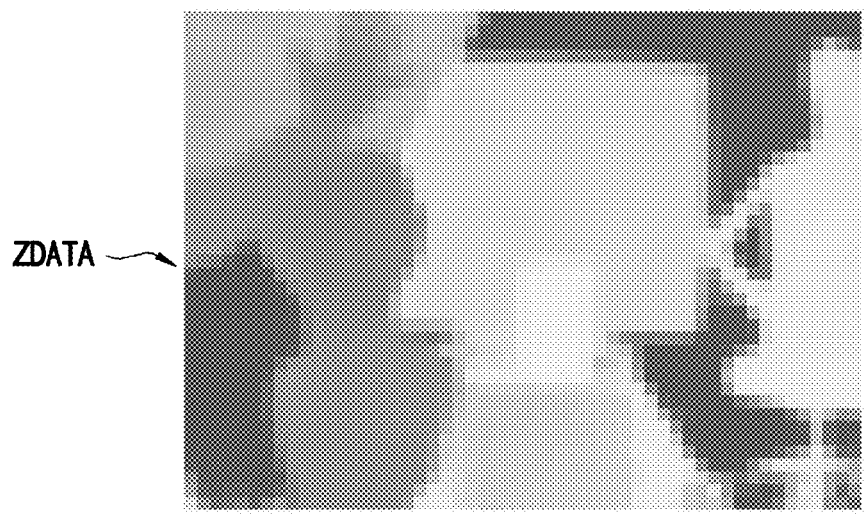
FIG. 7 is a diagram illustrating a frame of an example depth data obtained by an image capturing device.
Figure 8:
FIG. 8 is a diagram illustrating a frame of an example two-dimensional data obtained by an image capturing device.
Figure 9:
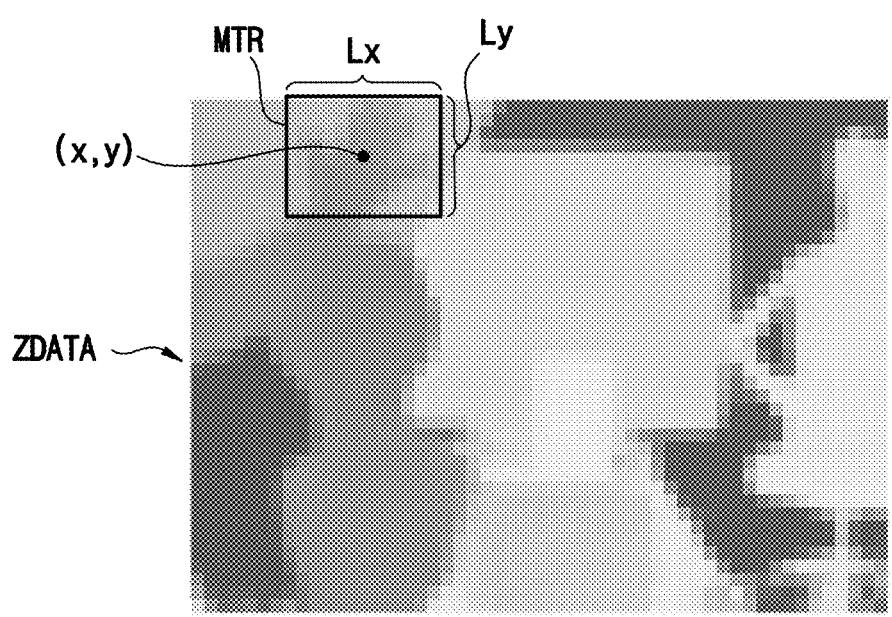
FIG. 9 is a diagram illustrating an example of a motion tracking region determined according to some example embodiments of the inventive concept.

FIG. 7 is a diagram illustrating a frame of an example depth data obtained by an image capturing device, FIG. 8 is a diagram illustrating a frame of an example two-dimensional data obtained by an image capturing device, and FIG. 9 is a diagram illustrating an example of a motion tracking region determined according to some example embodiments of the inventive concept.

As illustrated in FIGS. 7 and 8, the image capturing device 100 provides the frame of the depth data ZDATA has relatively a lower resolution, that is, the first resolution RES1 and the frame of the color data CDATA has relatively a higher resolution, that is, the second resolution RES2. For example, the first resolution RES1 may be the quarter video graphic array (QVGA) resolution of 320*240 pixels or a lower resolution than the QVGA resolution and the second resolution RES2 may be the high density (HD) resolution of 1280*720 pixels or a higher resolution than the HD resolution.

The motion region tracker 300 in FIG. 3 may recognize the target object based on the depth data ZDATA or the depth frame, and determines the motion tracking region MTR. The motion tracking region MTR corresponds to a portion of the frame and includes the target object in the scene. The scene may include a fixed background and the target object moving in the background. For example, the target object may be a hand of a human being as illustrated in FIG. 9, and the motion region tracker 300 may recognized the hand to determine the motion tracking region MTR including the hand.

The motion region tracker 300 may determine the motion tracking region MTR based on the several frames of the depth data ZDATA. The target object may be an independent thing such as a ball, a human body, etc. or a portion of the independent thing such as a hand, an arm, a head, etc. The recognition of the target object may be performed on various criteria according to the kind of the captured scene. For example, when the scene includes a plurality of moving objects, at least one target object may be determined based on the kind, the distance, the speed of the objects, etc. In some example embodiments, a simple three-dimensional recognition algorithm may be used to determine the target object based on the depth data ZDATA.

In some example embodiments, as illustrated in FIG. 9, the motion tracking region MTR may be determined by determining coordinates (x, y) of a center point of the motion tracking region MTR in the frame and determining a size (Lx, Ly) of the motion tracking region MTR in the frame. In some example embodiments, the motion tracking region MTR may be determined by determining coordinates of four edge points of the motion tracking region MTR in the frame.

As shown in FIGS. 7, 8, and 9, the target object corresponds to a portion of the captured scene and thus the motion tracking region corresponds to a portion of the entire frame.

Figure 10:
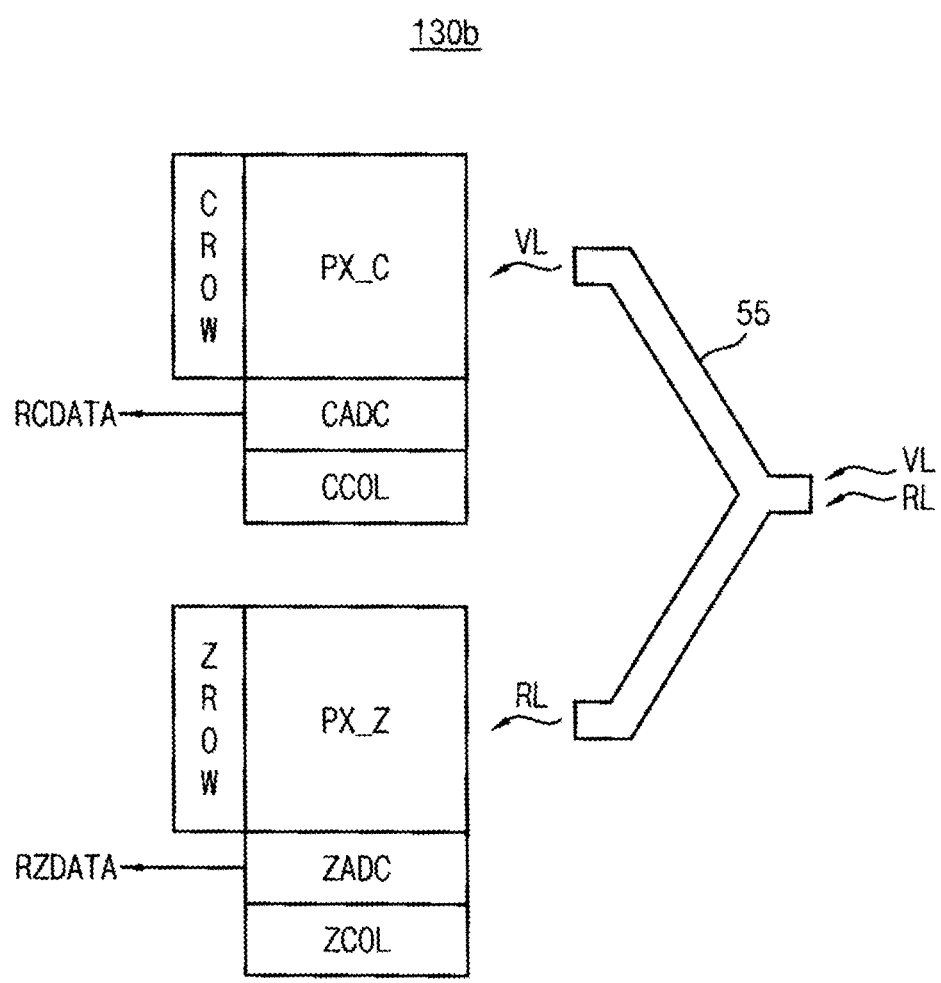
FIG. 10 is a diagram illustrating an example of a sensing unit in the image capturing device of FIG. 4.

FIG. 10 is a diagram illustrating an example of a sensing unit in the image capturing device of FIG. 4. FIG. 10 illustrates an example embodiment of a sensing unit 130b in a case where the image capturing device 100 of FIG. 4 includes a depth sensor and a two-dimensional image sensor distinct from each other.

Referring to FIG. 10, the sensing unit 130b may include a pixel array PX_C where a plurality of color pixels are arranged and a pixel array PX_Z where a plurality of depth pixels are arranged. The visible light VL for the image information and the reception light RL for the depth information may be separated by a beam splitter 55 and then illuminated to the respective pixel arrays PX_C and PX_Z.

A color pixel select circuit CROW and CCOL, a depth pixel select circuit ZROW and ZCOL, a color pixel converter CADC, and a depth pixel converter ZADC may be disposed adjacent to the respective pixel arrays PX_C and PX_Z. The color pixel select circuit CROW and CCOL and the color pixel converter CADC may provide the color information RCDATA by controlling the color pixels included in the pixel array PX_C, and the depth pixel select circuit ZROW and ZCOL and the depth pixel converter ZADC may provide the depth information RZDATA by controlling the depth pixels included in the pixel array PX_Z. The color information RCDATA and the depth information RZDATA from the sensing unit 130b may be raw data and the above-described two-dimensional data CDATA and the depth data ZDATA may be provided based on the raw data.

As such, the sensing unit 130b may include the depth sensor and the two-dimensional image sensor distinct from each other such that the components for controlling the color pixels and the components for controlling the depth pixels may be implemented to respectively provide the color information RCDATA and the depth information RZDATA.

Figures 11A, 11B:
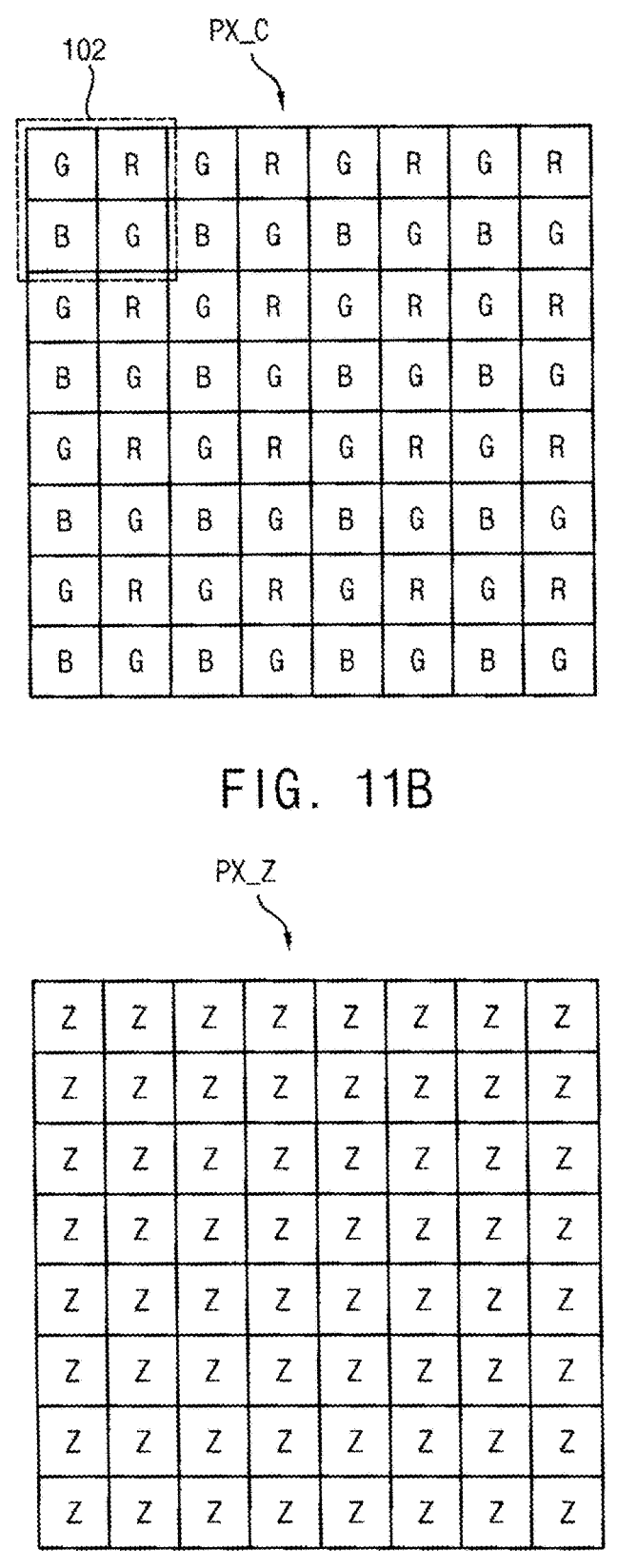

FIGS. 11A and 11B are diagrams illustrating example pixel arrays in the sensing unit of FIG. 10.

Referring to FIG. 11A, a first pixel array PX_C includes the color pixels R, G, and B for providing the image information. For example, a pixel pattern 102 including the green pixel G, the red pixel R, the blue pixel B, and the green pixel G may be repeatedly arranged in the first pixel array PX_C. Each of the color pixels R, G, and B may include a photo-detection region for collecting photo-electrons generated by the incident visible light. Color filters may be formed over the color pixels R, G, and B. For example, the red pixel R may be defined by the red filter, the green pixel G may be defined by the green filter, and/or the blue pixel B may be defined by the blue filter.

Referring to FIG. 11B, a second pixel array PX_Z includes the depth pixels Z for providing the depth information. For example, the identical depth pixels Z may be repeatedly arranged in the second pixel array PX_Z. Each of the depth pixels Z may include a photo-detection region for collecting photo-electrons generated by the reception light RL, that is, the incident infrared light or near-infrared light. The infrared light pass filter may be formed over each depth pixel Z.

FIGS. 12A, 12B, 12C, and 12D are circuit diagrams illustrating example unit pixels in a pixel array.

The unit pixels 200a, 200b, 200c, and 200d illustrated in FIGS. 12A, 12B, 12C, and 12D may be a color pixel including a color photodiode or a depth pixel including a depth photodiode.

Figure 12A:
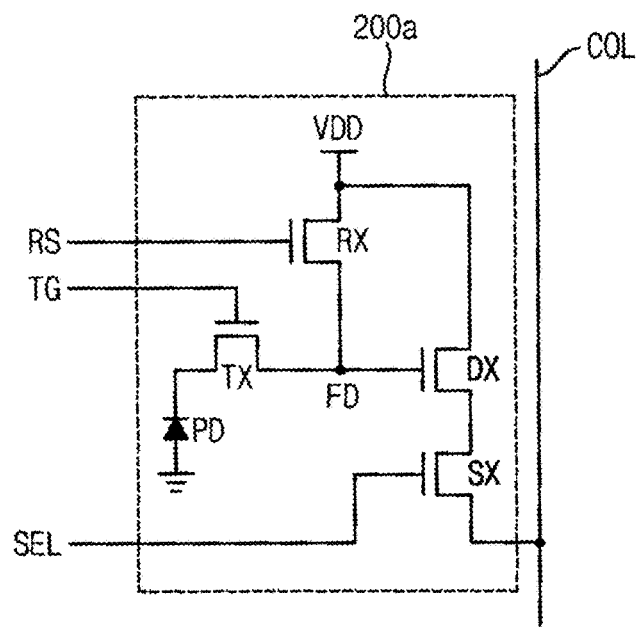
FIGS. 12A, 12B, 12C, and 12D are circuit diagrams illustrating some example unit pixels in a pixel array.

Referring to FIG. 12A, the unit pixel 200a may include a photo-sensitive element such as a photodiode PD, and a readout circuit including a transfer transistor TX, a reset transistor RX, a drive transistor DX, and a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 200a may include a photo transistor, a photo gate, a pinned photo diode, etc. instead of or in addition to the photodiode PD.

The photo-charge generated in the photodiode PD may be transferred to a floating diffusion node FD through the transfer transistor TX, which is turned on in response to a transfer control signal TG. The drive transistor DX functions as a source follower amplifier that amplifies a signal corresponding to the charge on the floating diffusion node FD. The selection transistor SX may transfer the amplified signal to a column line COL in response to a selection signal SEL. The floating diffusion node FD may be reset by the reset transistor RX. For example, the reset transistor RX may discharge the floating diffusion node FD in response to a reset signal RS for correlated double sampling (CDS).

Figure 12B:
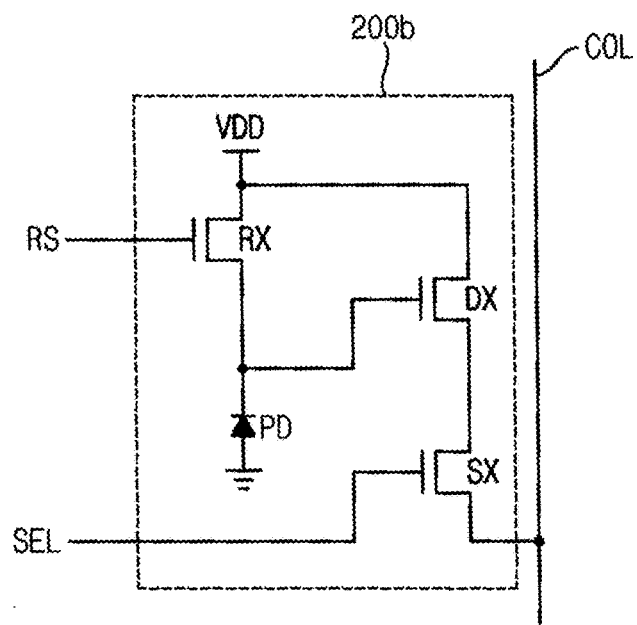
Figure 12C:
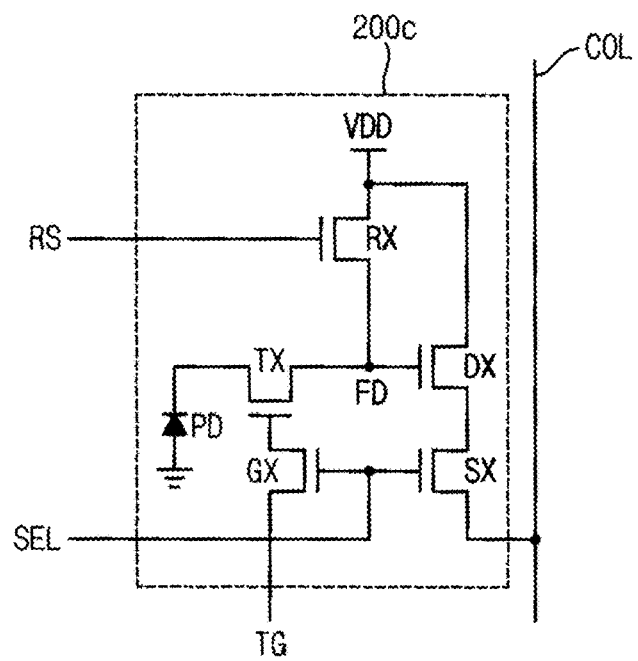
Figure 12D:
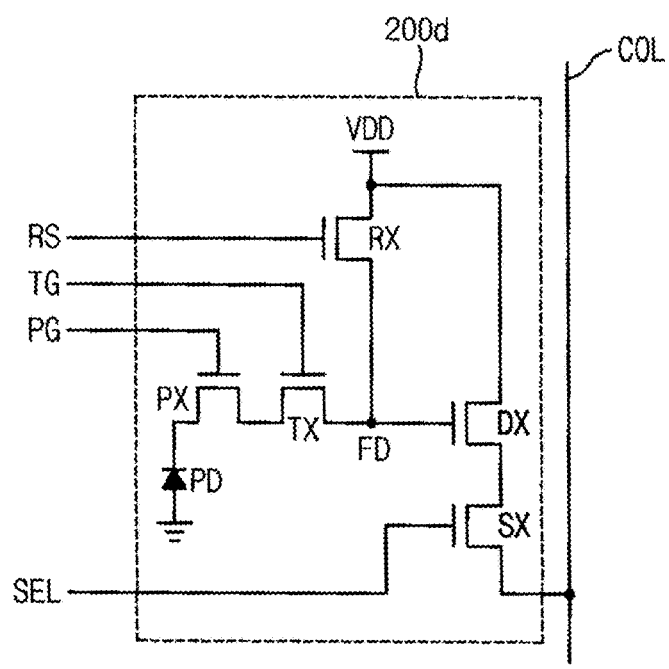

FIG. 12A illustrates the unit pixel 200a of the four-transistor configuration including the four transistors TX, RX, DX, and SX. The configuration of the unit pixel may be variously changed as illustrated in FIGS. 12B, 12C, and 12D. Power is supplied via voltage supply terminal VDD and ground.

Referring to FIG. 12B, the unit pixel 200b may have the three-transistor configuration including a photo-sensitive element such as a photodiode PD, and a readout circuit including a reset transistor RX, a drive transistor DX, and a selection transistor SX. Compared with the unit pixel 200a of FIG. 12A, the transfer transistor TX is omitted in the unit pixel 200b of FIG. 12B.

Referring to FIG. 12C, the unit pixel 200c may have the five-transistor configuration including a photo-sensitive element such as a photodiode PD, and a readout circuit including a transfer transistor TX, a gate transistor GX, a reset transistor RX, a drive transistor DX, and a selection transistor SX. The gate transistor GX may selectively apply the transfer control signal TG to the transfer transistor TX in response to the selection signal SEL. Compared with the unit pixel 200a of FIG. 12A, the gate transistor GX is further included in the unit pixel 200c of FIG. 12C.

Referring to FIG. 12D, the unit pixel 200d may have the five-transistor configuration including a photo-sensitive element such as a photodiode PD, and a readout circuit including a photo transistor PX, a transfer transistor TX, a reset transistor RX, a drive transistor DX, and a selection transistor SX. The photo transistor PX may be turned on or off in response to a photo gate signal PG. The unit pixel 200d may enabled when the photo transistor PX is turned on and disabled when the photo transistor PX is turned off. Compared with the unit pixel 200a of FIG. 12A, the photo transistor PX is further included in the unit pixel 200d of FIG. 12D. In addition, the unit pixel may have six-transistor configuration further including the gate transistor GX of FIG. 12C (or a bias transistor) in addition to the configuration of FIG. 12D.

Figure 13:
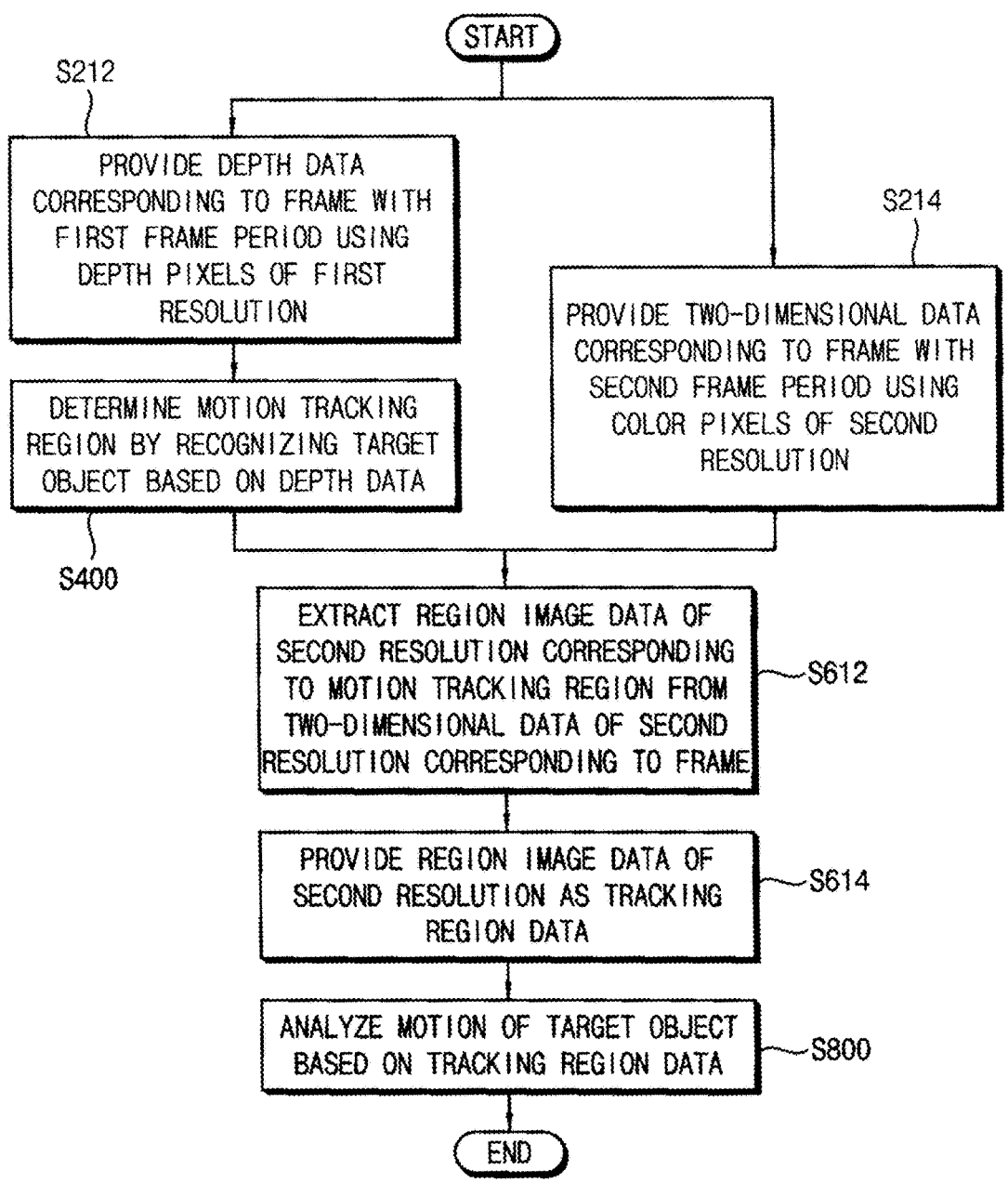
FIG. 13 is a flowchart illustrating a method of recognizing a motion of an object according to some example embodiments of the inventive concept.

FIG. 13 is a flowchart illustrating a method of recognizing a motion of an object according to some example embodiment of the inventive concept.

Referring to FIG. 13, the image capturing device 100 as illustrated in FIG. 4 obtains and provides the depth data ZDATA corresponding to the frame with a first frame period PFRAME1 using the depth pixels Z of the first resolution RES1 (S212). In addition, the image capturing device 100 obtains and provides the two-dimensional data CDATA corresponding to the frame with a second frame period PFRAME2 using the color pixels R, G, and B of the second resolution RES2 (S214). In some example embodiments, the image capturing device 100 may include the one pixel array PX_CZ in which the depth pixels Z and the color pixels R, G, and B are alternatively arranged as illustrated in FIG. 6. In some example embodiments, the image capturing device 100 may include the two distinct pixel array PX_CZ in which the depth pixels Z and the color pixels R, G, and B are arranged respectively as illustrated in FIGS. 11A and 12B. In other words, the image capturing device 100 may include a three-dimensional image sensor in some example embodiments, and/or the depth sensor and the two-dimensional image sensor distinct from each other in some example embodiments.

The motion region tracker 300 determines the motion tracking region MTR by recognizing the target object in the scene corresponding to the frame based on the depth data ZDATA (S400). The motion region tracker 300 extracts region image data of the second resolution RES2 corresponding to the motion tracking region MTR from the two-dimensional data CDATA of the second resolution RES2 corresponding to the frame (S612) and provides the region image data of the second resolution RES2 as the tracking region data TRDATA (S614). The motion analyzer 500 analyzes a motion of the target object based on the tracking region data TRDATA (S800) that are provided periodically.

Figure 14:
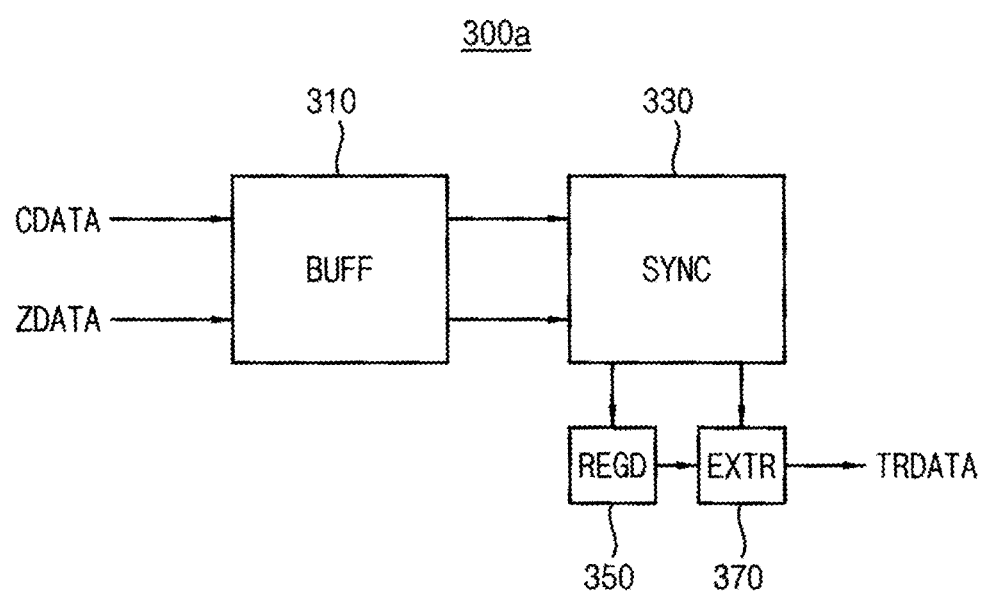
FIG. 14 is a block diagram illustrating an example of a motion region tracker in a motion recognizing device according to some example embodiments of the inventive concept.

FIG. 14 is a block diagram illustrating an example of a motion region tracker in a motion recognizing device according to some example embodiments of the inventive concept.

Referring to FIG. 14, a motion region tracker 300a may include a data buffer (BUFF) 310, a synchronizer (SYNC) 330, a tracking region determiner (REGD) 350, and a data extractor (EXTR) 370.

The data buffer 310 may store the depth data ZDATA provided with the first frame period PFRAME1 and the two-dimensional data CDATA provided with the second frame period PFRAME2 from the image capturing device 100.

The synchronizer 330 may synchronize the depth data ZDATA and the two-dimensional data CDATA to be matched with each other, when the first frame period PFRAME1 is different from the second frame period PFRAME2. The operation of the synchronizer 330 is further described with reference to FIGS. 15A, 15B and 15C. The synchronizer 330 may be omitted when the first frame period PFRAME1 is equal to the second frame period PFRAME2.

The tracking region determiner 350 may determine the motion tracking region MTR by recognizing the target object in the scene based on the depth data ZDATA. The result of the determination may be provided to the data extractor 370 as the coordinates (x, y) of the center point and the size (Lx, Ly) of the motion tracking region MTR as described with reference to FIG. 9.

The data extractor 370 may extract the region image data of the second resolution RES2 corresponding to the motion tracking region MTR from the two-dimensional data CDATA of the second resolution RES2 corresponding to the frame (S612) and provides the region image data of the second resolution RES2 as the tracking region data TRDATA (S614).

As such, the target object may be discerned using the depth data ZDATA of the lower first resolution RES1, then the kind, the shape, and/or the motion of the target object may be analyzed using the tracking region data TRDATA of the higher second resolution RES2, and thus the motion of the target object may be better recognized.

Figure 15A:
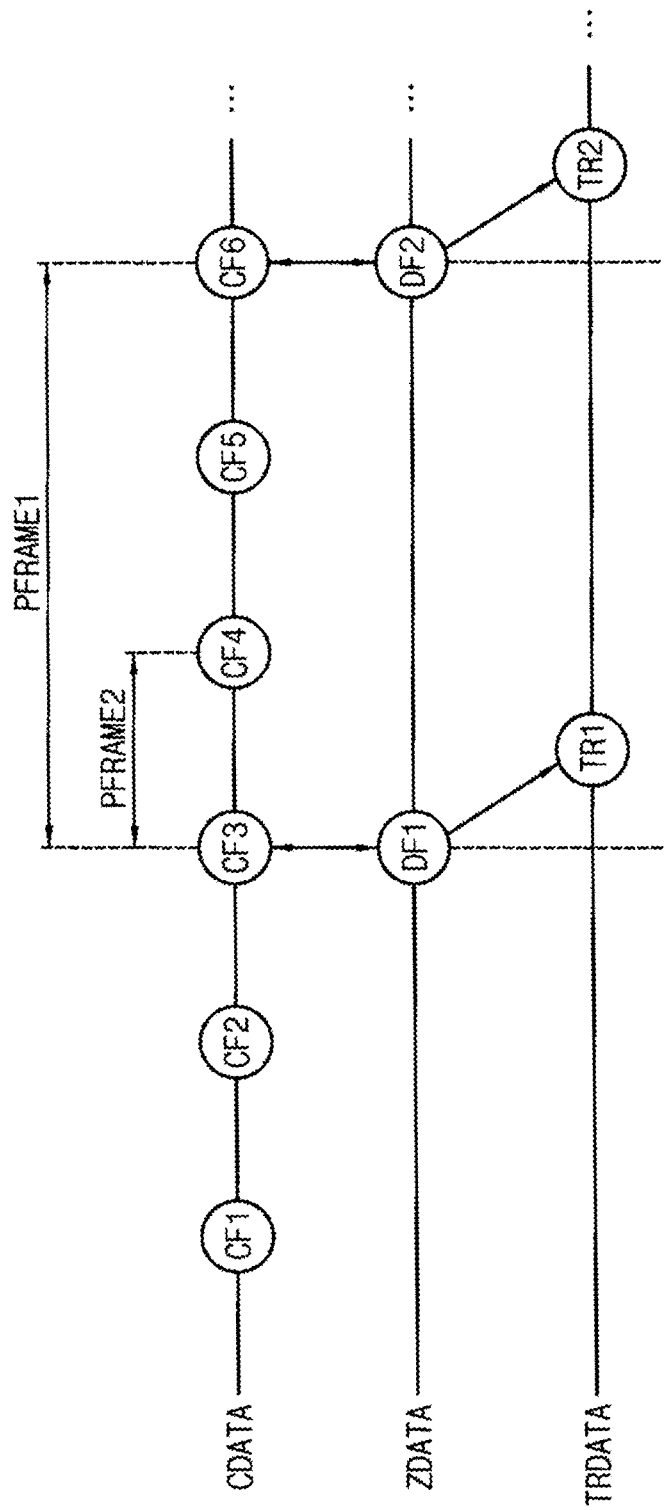
FIGS. 15A, 15B, and 15C are diagrams illustrating example operations of a synchronizer in the motion region tracker of FIG. 14.
Figure 15B:
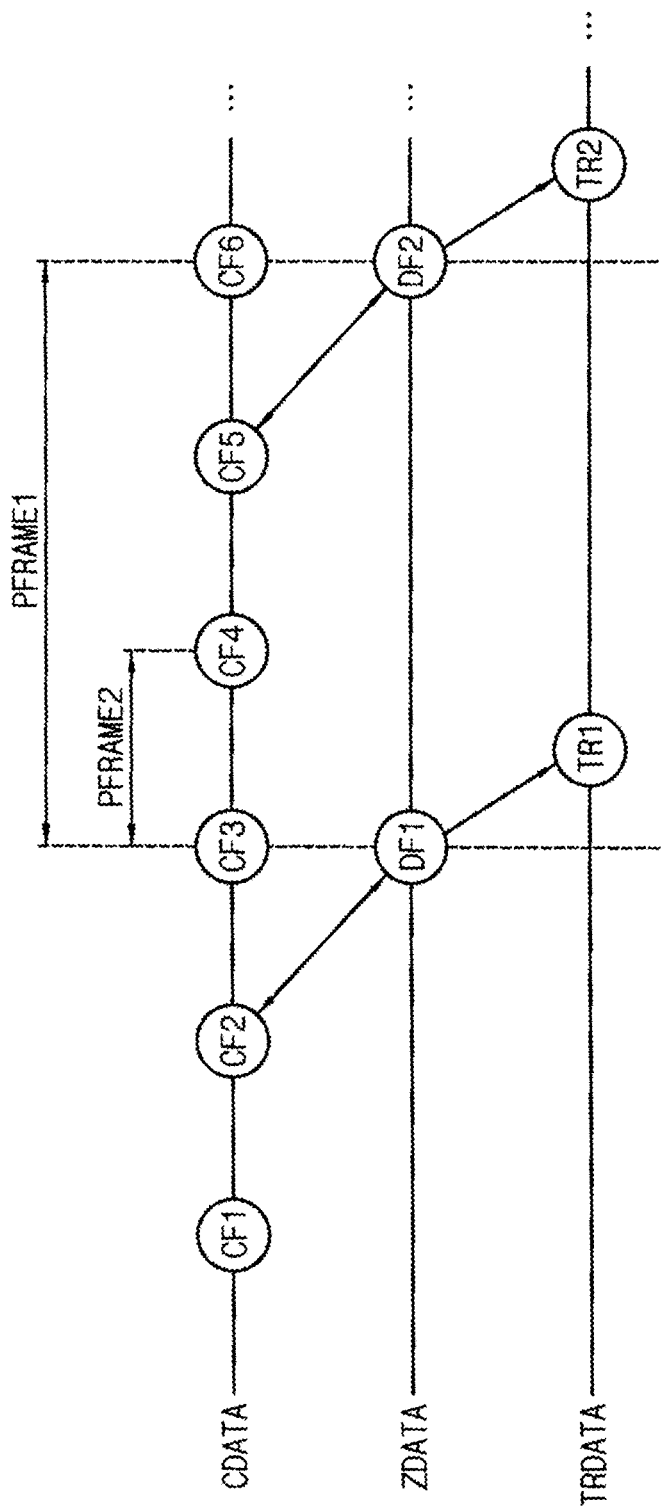
Figure 15C:
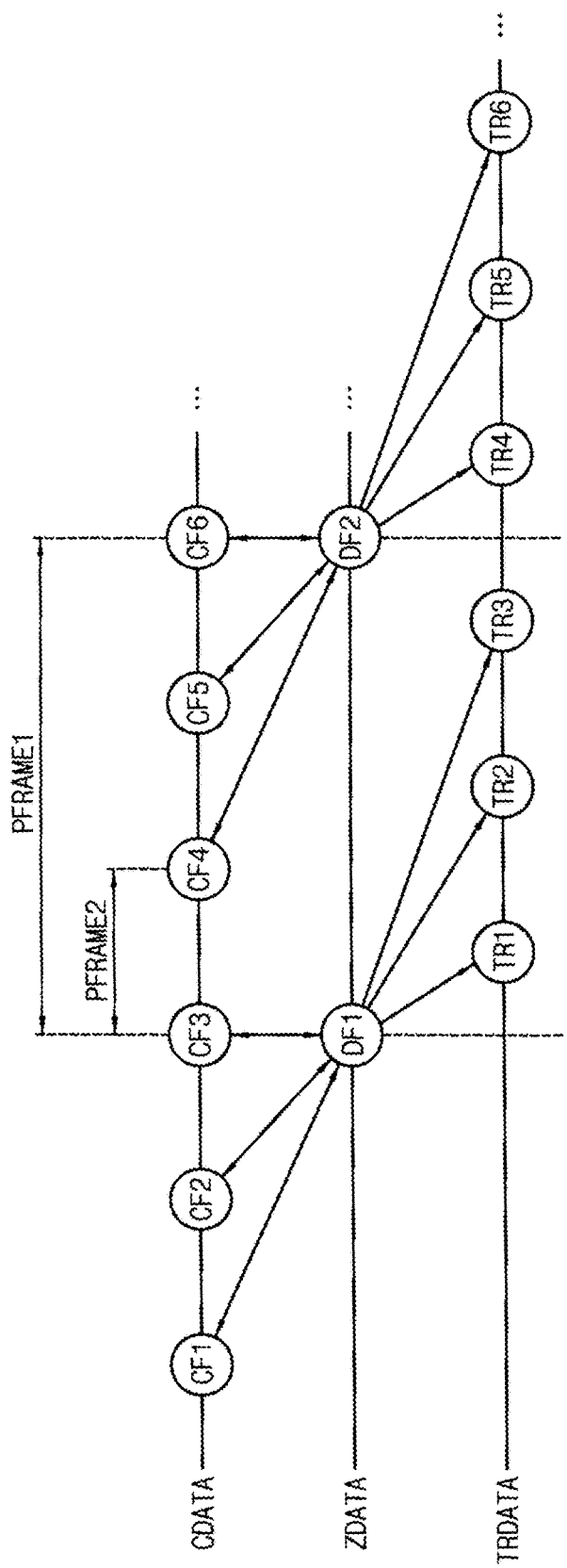

FIGS. 15A, 15B, and 15C are diagrams illustrating example operations of a synchronizer in the motion region tracker of FIG. 14.

As illustrated in FIGS. 15A, 15B, and 15C, the first frame period PFRAME1 of the depth data ZDATA may be different from the second frame period PFRAME2 of the two-dimensional data CDATA. For example, the frame rate (e.g., 60 fps) of the two-dimensional data CDATA may be three times the frame rate (e.g., 20 fps) of the depth data ZDATA.

In this case, the image capturing device 100 may sense and provide first, second, and third two-dimensional frame data CF1, CF2, and CF3 while sensing and providing first depth frame data DF1. In the same way, the image capturing device 100 may sense and provide fourth, fifth, and sixth two-dimensional frame data CF4, CF5, and CF6 while sensing and providing second depth frame data DF2. The tracking region data TRDATA may be provided with the first frame period PFRAME1 as illustrated in FIGS. 15A and 15B or with the second frame period PFRAME2 as illustrated in FIG. 15C, according to the operation of the synchronizer 330 in FIG. 14.

Referring to FIG. 15A, the synchronizer 330 may synchronize the one depth frame data and the one two-dimensional frame data, which are provided simultaneously from the image capturing device 100 to provide the synchronized depth and two-dimensional frame data to the tracking region determiner 350 and the data extractor 370. In other words, the synchronizer 330 may match and provide the first depth frame data DF1 and the third two-dimensional frame data CF3. In the same way, the synchronizer 330 may match and provide the second depth frame data DF2 and the sixth two-dimensional frame data CF6.

The tracking region determiner 350 may determine a first motion tracking region MTR1 based on the first depth frame data DF1, and the data extractor 370 may extract the portion corresponding to the first motion tracking region MTR1 from the third two-dimensional frame data CF3 to provide first tracking region data TR1. In the same way, the tracking region determiner 350 may determine a second motion tracking region MTR2 based on the second depth frame data DF2, and the data extractor 370 may extract the portion corresponding to the second motion tracking region MTR2 from the sixth two-dimensional frame data CF6 to provide second tracking region data TR2. As such, the first tracking region data TR1 may be provided with the first frame period PFRAME1.

Referring to FIG. 15B, the synchronizer 330 may synchronize the one depth frame data and the one two-dimensional frame data, which are provided at different time points from the image capturing device 100 to provide the synchronized depth and two-dimensional frame data to the tracking region determiner 350 and the data extractor 370. In other words, the synchronizer 330 may match and provide the first depth frame data DF1 and the second two-dimensional frame data CF2. In the same way, the synchronizer 330 may match and provide the second depth frame data DF2 and the fifth two-dimensional frame data CF5. Since the first frame period PFRAME1 and the second frame period PFRAME2, the depth frame data may be matched with the two-dimensional frame data corresponding to a center of the sensing period for the corresponding depth frame data.

The tracking region determiner 350 may determine a first motion tracking region MTR1 based on the first depth frame data DF1, and the data extractor 370 may extract the portion corresponding to the first motion tracking region MTR1 from the second two-dimensional frame data CF2 to provide first tracking region data TR1. In the same way, the tracking region determiner 350 may determine a second motion tracking region MTR2 based on the second depth frame data DF2, and the data extractor 370 may extract the portion corresponding to the second motion tracking region MTR2 from the fifth two-dimensional frame data CF5 to provide second tracking region data TR2. As such, the first tracking region data TR1 may be provided with the first frame period PFRAME1.

Referring to FIG. 15C, the synchronizer 330 may synchronize the one depth frame data and the three two-dimensional frame data to provide the synchronized depth and two-dimensional frame data to the tracking region determiner 350 and the data extractor 370. In other words, the synchronizer 330 may match and provide the first depth frame data DF1 with the first, second, and third two-dimensional frame data CF1, CF2, and CF3. In the same way, the synchronizer 330 may match and provide the second depth frame data DF2 with the fourth, fifth, and sixth two-dimensional frame data CF4, CF5, and CF6.

The tracking region determiner 350 may determine a first motion tracking region MTR1 based on the first depth frame data DF1, and the data extractor 370 may extract the portions corresponding to the first motion tracking region MTR1 respectively from the first, second, and third two-dimensional frame data CF1, CF2, and CF3 to provide first, second, and third tracking region data TR1, TR2, and TR3. In the same way, the tracking region determiner 350 may determine a second motion tracking region MTR2 based on the second depth frame data DF2, and the data extractor 370 may extract the portions corresponding to the second motion tracking region MTR2 respectively from the fourth, fifth, and sixth two-dimensional frame data CF4, CF5, and CF6 to provide fourth, fifth, and sixth tracking region data TR4, TR5, and TR6. As such, the first tracking region data TR1 may be provided with the second frame period PFRAME2.

Figure 16:
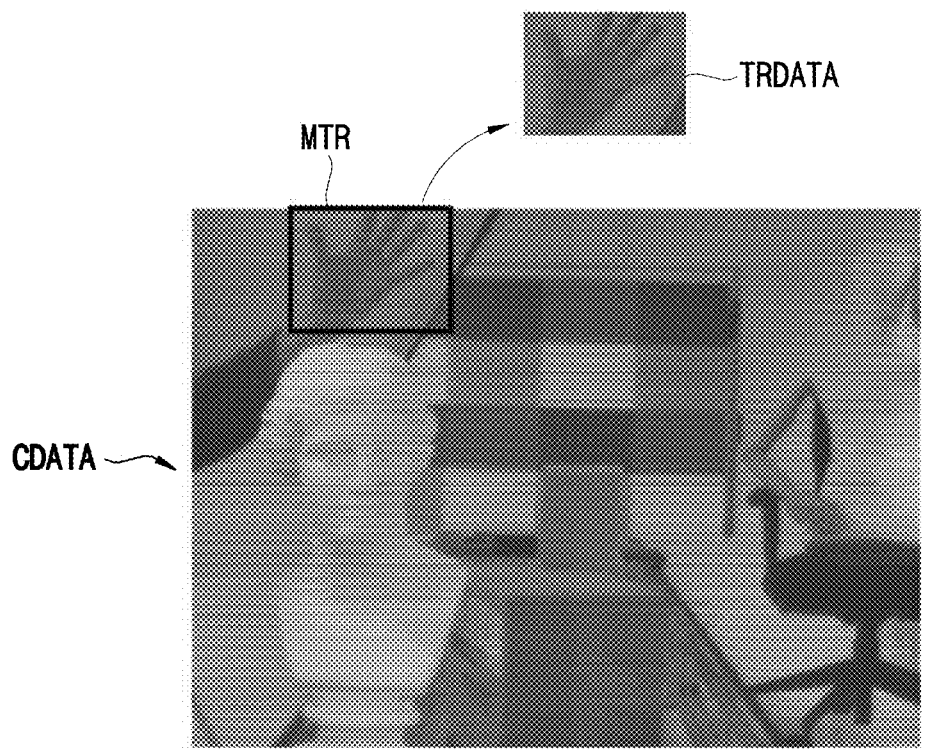
FIG. 16 is a diagram for describing tracking region data provided by the motion region tracker of FIG. 14.

FIG. 16 is a diagram for describing tracking region data provided by the motion region tracker of FIG. 14.

FIG. 16 illustrates the two-dimensional image frame corresponding to the two-dimensional data CDATA and the tracking region data TRDATA extracted from the two-dimensional data CDATA. As described above, the portion of the two-dimensional data CDATA of the second resolution RES2, which corresponds to the motion tracking region MTR, may be provided as the tracking region data TRDATA. The data transfer and calculation amount for the motion recognition may be reduced because the motion of the target object may be analyzed based on the tracking region data TRDATA of the motion tracking region MTR corresponding to a portion of an entire frame, and the motion recognition may be better performed because the tracking region data TRDATA has the higher second resolution RES2.

Figure 17A:
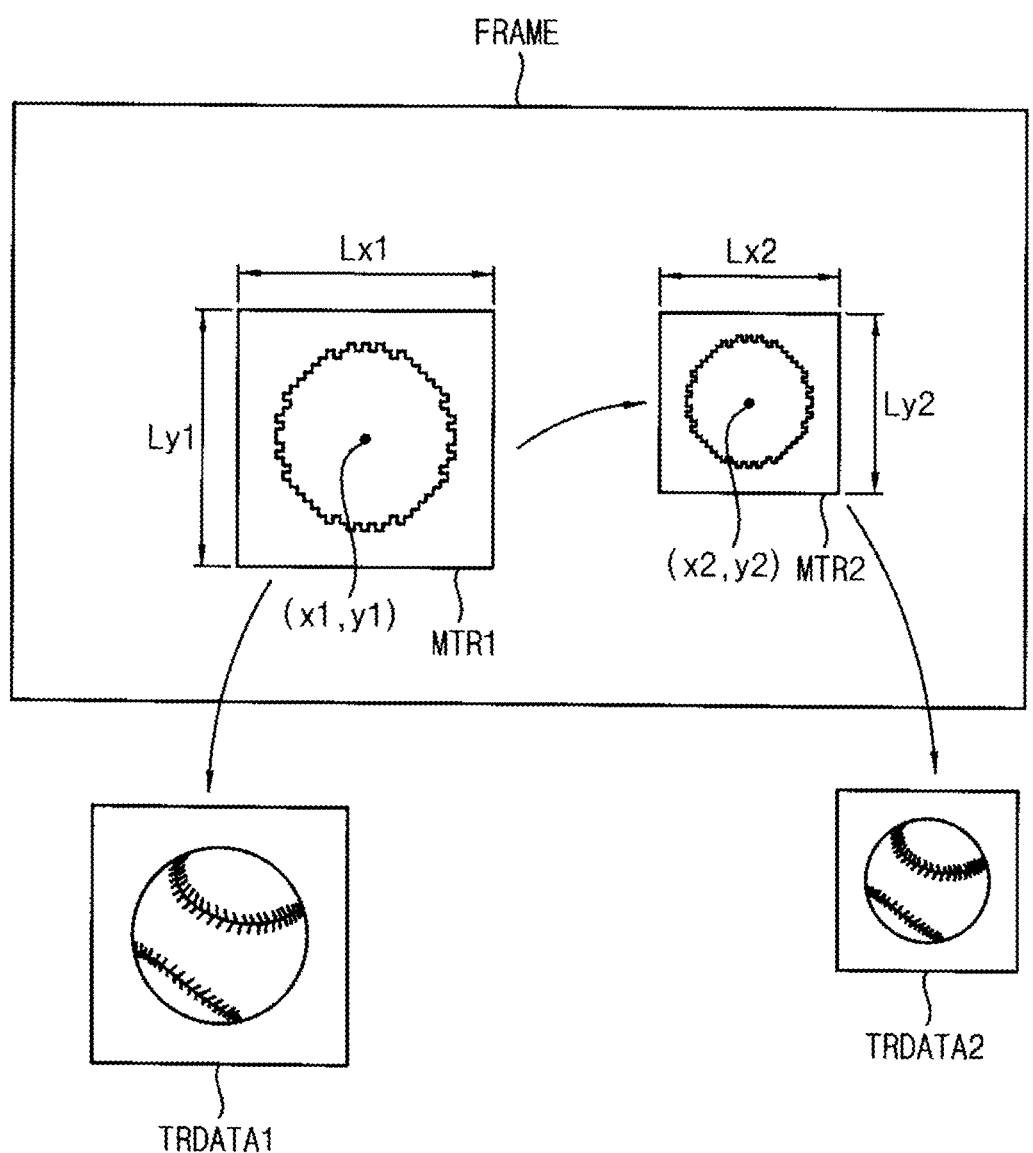
FIGS. 17A and 17B are diagrams for describing a method of upgrading a motion tracking region according to some example embodiments of the inventive concept.
Figure 17B:
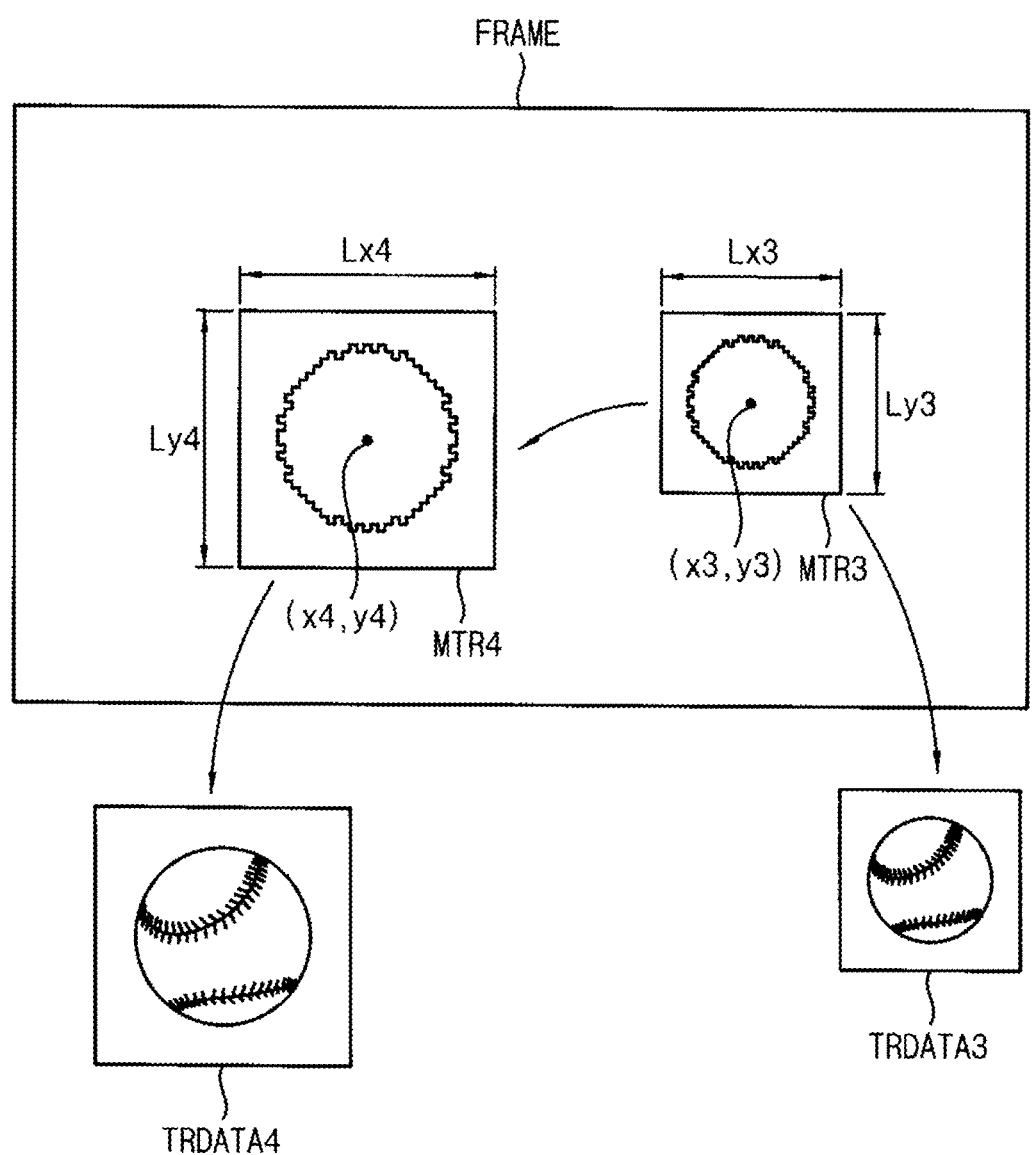

FIGS. 17A and 17B are diagrams for describing a method of upgrading a motion tracking region according to some example embodiments of the inventive concept.

FIGS. 17A and 17B illustrate the motion tracking regions MTR1 through MTR4 and the corresponding tracking region data TRDATA1 through TRDATA4. The motion tracking region may be upgraded according to the motion of the target object, as illustrated in FIGS. 17A and 17B. In some example embodiments, the tracking region determiner 350 in FIG. 14 may detect a change of a position of the target object in the scene based on the depth data ZDATA and change coordinates of a center point of the motion tracking region in the frame based on the change of the position of the target object in the scene. In some example embodiments, the tracking region determiner 350 may detect a change of a distance to the target object based on the depth data ZDATA and change the size of the motion tracking region MTR based on the change of the distance to the target object.

FIG. 17A illustrates a case where the distance to the target object from the image capturing device 100 is increased, and FIG. 17B illustrates a case where the distance to the target object from the image capturing device 100 is decreased. When the distance to the target object increases as illustrated in FIG. 17A, the center coordinates of the motion tracking region may be changed from (x1, y1) to (x2, y2) and the size of the motion tracking region may be decreased from (Lx1, Ly1) to (Lx2, Ly2). When the distance to the target object decreases as illustrated in FIG. 17B, the center coordinates of the motion tracking region may be changed from (x3, y3) to (x4, y4) and the size of the motion tracking region may be increased from (Lx3, Ly3) to (Lx4, Ly4).

Figure 18:
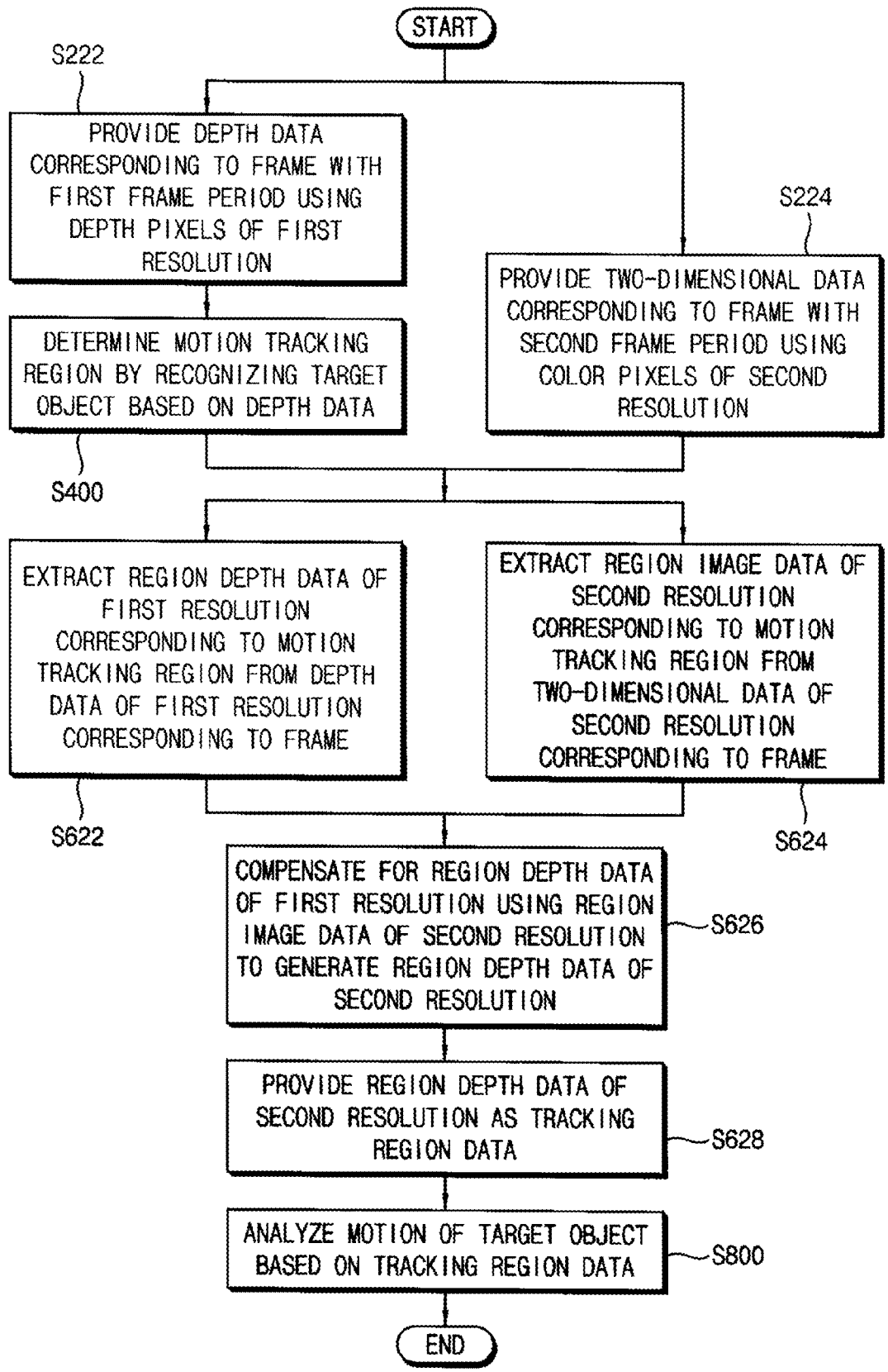
FIG. 18 is a flowchart illustrating a method of recognizing a motion of an object according to some example embodiments of the inventive concept.

FIG. 18 is a flowchart illustrating a method of recognizing a motion of an object according to some example embodiments of the inventive concept.

Referring to FIG. 18, the image capturing device 100 as illustrated in FIG. 4 obtains and provides the depth data ZDATA corresponding to the frame with the first frame period PFRAME1 using the depth pixels Z of the first resolution RES1 (S222). In addition, the image capturing device 100 obtains and provides the two-dimensional data CDATA corresponding to the frame with the second frame period PFRAME2 using the color pixels R, G, and B of the second resolution RES2 (S224). In some example embodiments, the image capturing device 100 may include the one pixel array PX_CZ in which the depth pixels Z and the color pixels R, G, and B are alternatively arranged as illustrated in FIG. 6. In some example embodiments, the image capturing device 100 may include the two distinct pixel arrays PX_Z and PX_C in which the depth pixels Z and the color pixels R, G, and B are arranged respectively as illustrated in FIGS. 11A and 12B. In other words, the image capturing device 100 may include a three-dimensional image sensor in some example embodiments, and/or the depth sensor and the two-dimensional image sensor distinct from each other in some example embodiments.

The motion region tracker 300 determines the motion tracking region MTR by recognizing the target object in the scene corresponding to the frame based on the depth data ZDATA (S400). The motion region tracker 300 extracts region depth data of the first resolution RES1 corresponding to the motion tracking region MTR from the depth data ZDATA of the first resolution RES1 corresponding to the frame (S622), and extracts region image data of the second resolution RES2 corresponding to the motion tracking region MTR from the two-dimensional data CDATA of the second resolution RES2 corresponding to the frame (S624). The motion region tracker 300 compensates for the region depth data of the first resolution RES1 using the region image data of the second resolution RES2 to generate region depth data of the second resolution RES2 (S626), and provides the region depth data of the second resolution RES2 as the tracking region data TRDATA (S628). The motion analyzer 500 analyzes the motion of the target object based on the tracking region data TRDATA (S800) that are provided periodically.

Figure 19:
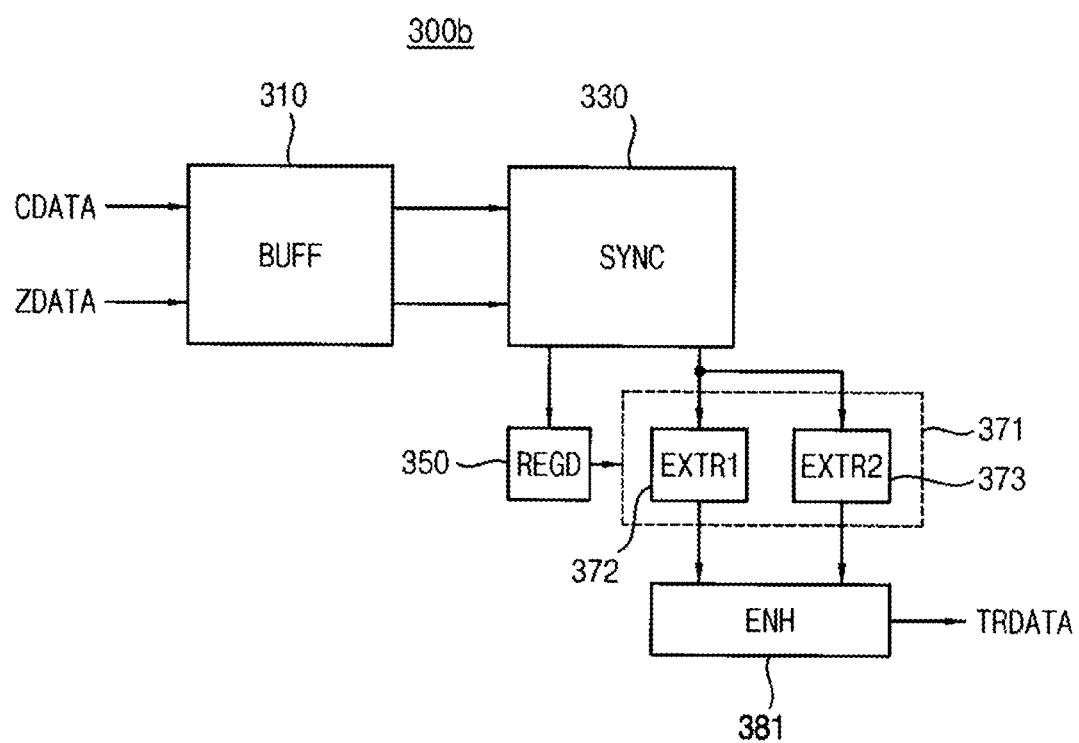
FIG. 19 is a block diagram illustrating an example of a motion region tracker in a motion recognizing device according to some example embodiments of the inventive concept.

FIG. 19 is a block diagram illustrating an example of a motion region tracker in a motion recognizing device according to some example embodiments of the inventive concept.

Referring to FIG. 19, a motion region tracker 300b may include a data buffer (BUFF) 310, a synchronizer (SYNC) 330, a tracking region determiner (REGD) 350, a data extraction unit 371, and an image enhancer (ENH) 381.

The data buffer 310 may store the depth data ZDATA provided with the first frame period PFRAME1 and the two-dimensional data CDATA provided with the second frame period PFRAME2 from the image capturing device 100.

The synchronizer 330 may synchronize the depth data ZDATA and the two-dimensional data CDATA to be matched with each other, when the first frame period PFRAME1 is different from the second frame period PFRAME2. The operation of the synchronizer 330 is the same as described with reference to FIGS. 15A, 15B, and 15C. The synchronizer 330 may be omitted when the first frame period PFRAME1 is equal to the second frame period PFRAME2.

The tracking region determiner 350 may determine the motion tracking region MTR by recognizing the target object in the scene based on the depth data ZDATA (S400). The result of the determination may be provided to the data extractor 370 as the coordinates (x, y) of the center point and the size (Lx, Ly) of the motion tracking region MTR as described with reference to FIG. 9.

The data extraction unit 371 may include a first data extractor (EXTR1) 372 and a second data extractor (EXTR2) 373. The first data extractor 372 may extract region depth data of the first resolution RES1 corresponding to the motion tracking region MTR from the depth data ZDATA of the first resolution RES1 corresponding to the frame (S622). The second data extractor 373 may extract region image data of the second resolution RES2 corresponding to the motion tracking region MTR from the two-dimensional data CDATA of the second resolution RES2 corresponding to the frame (S624).

The image enhancer 381 may compensate for the region depth data of the first resolution RES1 using the region image data of the second resolution RES2 to generate region depth data of the second resolution RES2 (S626), and provide the region depth data of the second resolution RES2 as the tracking region data TRDATA (S628). For example, the image enhancer 381 may extract information of edges or textures from the region image data of the second resolution RES2, and compensate for the region depth data of the first resolution RES1 using the edge and/or textures information to generate the region depth data of the second resolution RES2.

As such, the target object may be discerned using the depth data ZDATA of the lower first resolution RES1, then the kind, the shape and/or the motion of the target object may be analyzed using the tracking region data TRDATA of the higher second resolution RES2, and thus the motion of the target object may be better recognized. Such a method of enhancing the resolution of the depth data using the two-dimension data of the higher resolution, with respect to only a portion of an entire frame, may be referred to as "local super-resolution".

Figure 20:
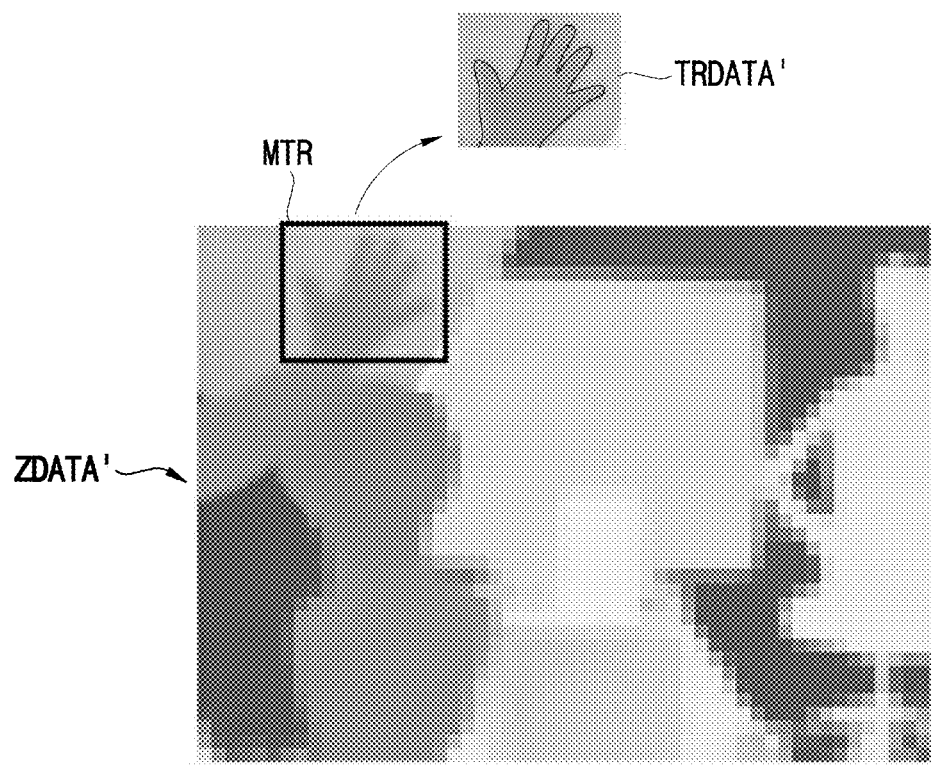
FIG. 20 is a diagram for describing tracking region data provided by the motion region tracker of FIG. 19.

FIG. 20 is a diagram for describing tracking region data provided by the motion region tracker of FIG. 19.

FIG. 20 illustrates the depth frame corresponding to the depth data ZDATA' and the tracking region data TRDATA' extracted from the depth data ZDATA'. As described above, the portion of the depth data ZDATA' of the first resolution RES1, which corresponds to the motion tracking region MTR, may be extracted. The extracted portion may be compensated for as described above and the compensated portion may be provided as the tracking region data TRDATA'. As illustrated in FIG. 20, the edges of the target object may be reinforced compared with the corresponding portion of the depth data ZDATA'. As such, improved analysis in addition to the reduction of data transfer and calculation amount may be achieved by enhancing the lower-resolution depth data corresponding to only a portion of an entire frame.

Figure 21:
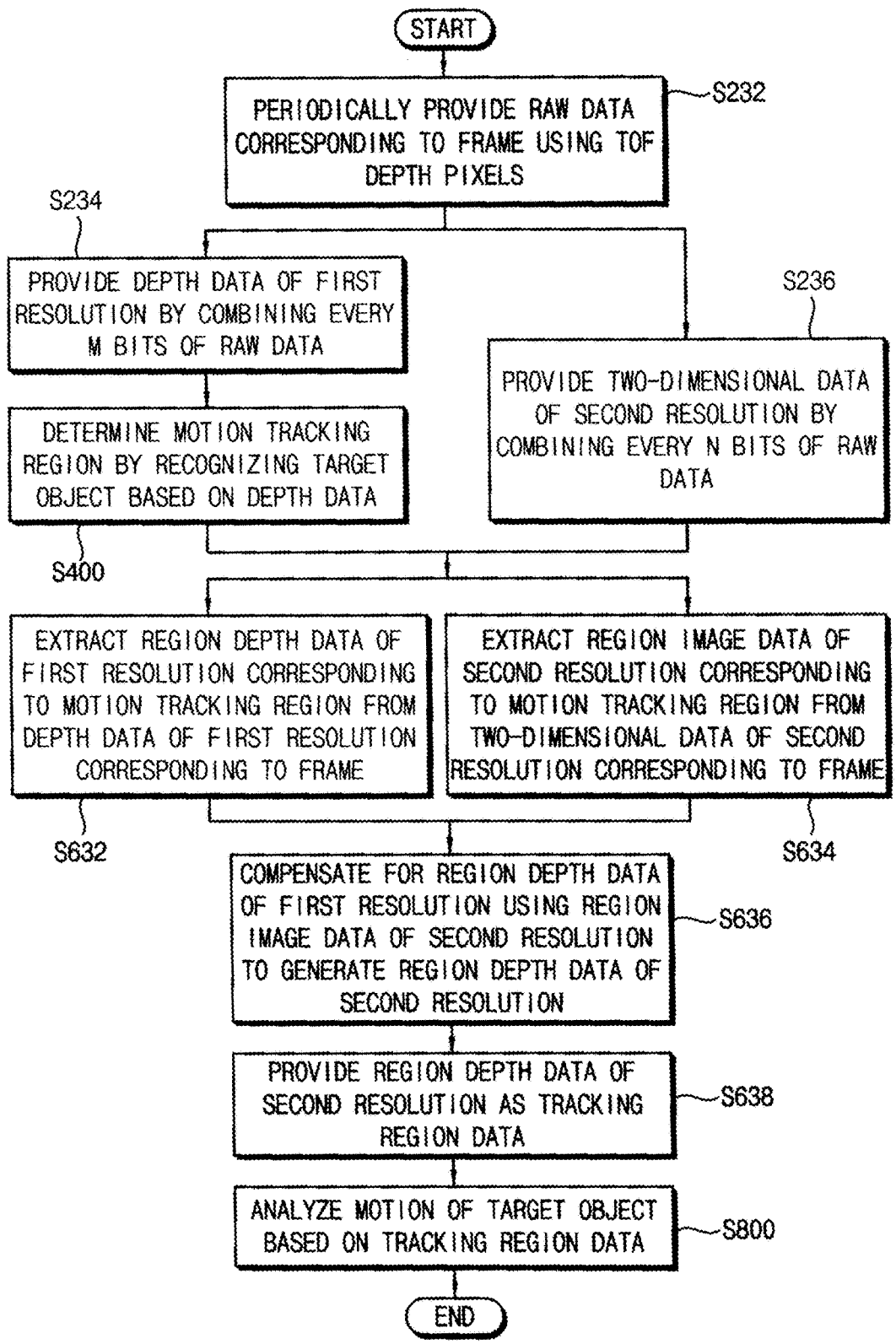
FIG. 21 is a flowchart illustrating a method of recognizing a motion of an object according to some example embodiments of the inventive concept.

FIG. 21 is a flowchart illustrating a method of recognizing a motion of an object according to some example embodiments of the inventive concept.

Figure 23:
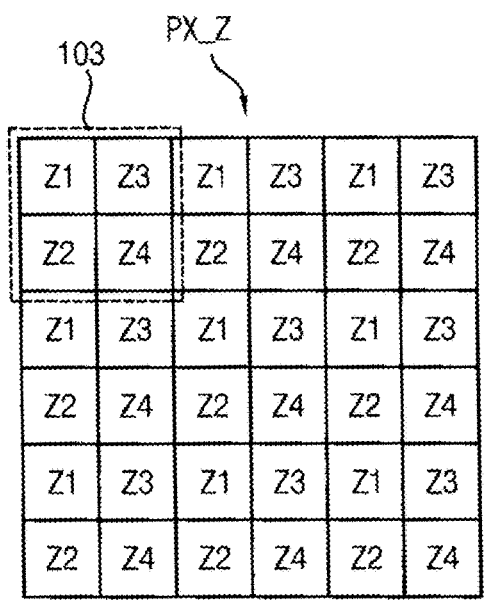
FIG. 23 is a diagram illustrating an example of a pixel array included in a depth sensor.

Referring to FIG. 21, the image capturing device 100 as illustrated in FIG. 4 obtains and provides periodically raw data RZDATA corresponding to the frame using time-of-flight (TOF) depth pixels (S232). In this case, the image capturing device 100 may include a single pixel array PX_Z in which the depth pixels Z are arranged as illustrated in FIG. 23. In other words, the image capturing device 100 may correspond to a depth sensor.

The motion region tracker 300 provides the depth data ZDATA of the first resolution RES1 by combining every M bits of the raw data RZDATA (S234), where M is a positive integer equal to or greater than two, as will be described with reference to FIG. 26, and provides the two-dimensional data CDATA of the second resolution RES2 by combining every N bits of the raw data RZDATA (S236), where N is a positive integer equal to or smaller than M, as will be described with reference to FIGS. 28A and 28B. In this case, the two-dimensional data CDATA may be black and white image data BWDATA.

The motion region tracker 300 determines the motion tracking region MTR by recognizing the target object in the scene corresponding to the frame based on the depth data ZDATA (S400). The motion region tracker 300 extracts region depth data of the first resolution RES1 corresponding to the motion tracking region MTR from the depth data ZDATA of the first resolution RES1 corresponding to the frame (S632), and extracts region image data of the second resolution RES2 corresponding to the motion tracking region MTR from the two-dimensional data CDATA of the second resolution RES2 corresponding to the frame (S634). The motion region tracker 300 compensates for the region depth data of the first resolution RES1 using the region image data of the second resolution RES2 to generate region depth data of the second resolution RES2 (S636), and provides the region depth data of the second resolution RES2 as the tracking region data TRDATA (S638). The motion analyzer 500 analyzes the motion of the target object based on the tracking region data TRDATA (S800) that are provided periodically.

Figure 22:
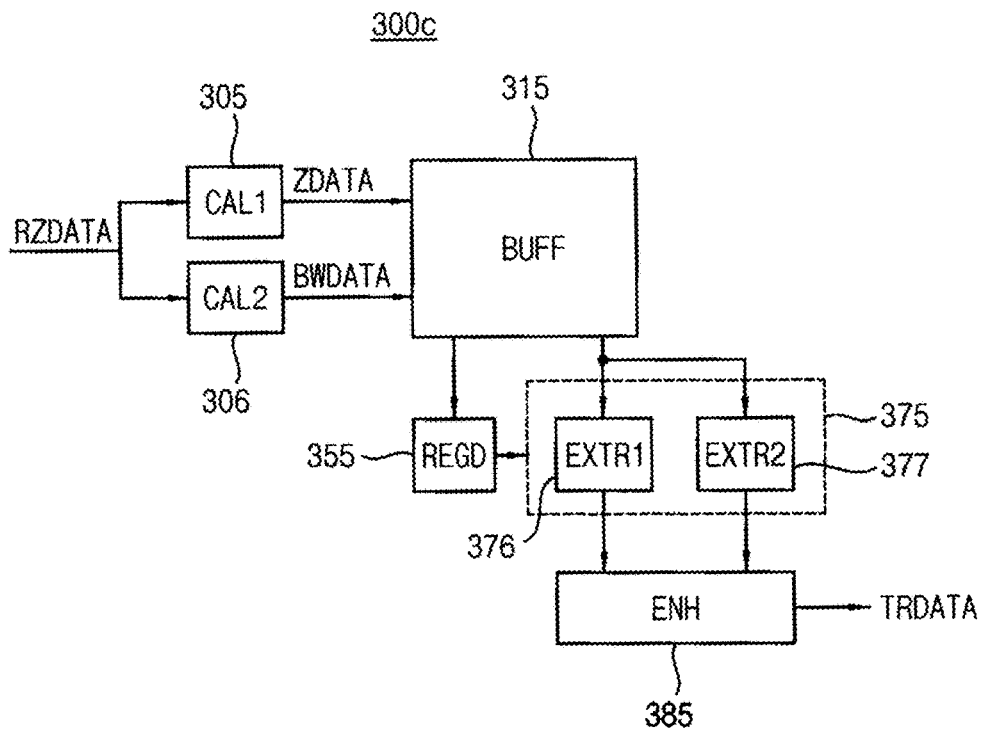
FIG. 22 is a block diagram illustrating an example of a motion region tracker in a motion recognizing device according to some example embodiments of the inventive concept.

FIG. 22 is a block diagram illustrating an example of a motion region tracker in a motion recognizing device according to some example embodiments of the inventive concept.

Referring to FIG. 22, a motion region tracker 300c may include a first calculator (CAL1) 305, a second calculator (CAL2) 306, a data buffer (BUFF) 315, a tracking region determiner (REGD) 355, a data extraction unit 375, and an image enhancer (ENH) 385.

The first calculator 305 may provide the depth data ZDATA of the first resolution RES1 by combining every M bits of the raw data RZDATA (S234) that are provided periodically from the image capturing device 100, where M is a positive integer equal to or greater than two. The second calculator 306 may provide the two-dimensional data BWDATA of the second resolution RES2 by combining every N bits of the raw data RZDATA (S236), where N is a positive integer equal to or smaller than M. The data buffer 315 may store the depth data ZDATA and the two-dimensional data BWDATA provided periodically from the image capturing device 100. The tracking region determiner 355 may determine the motion tracking region MTR by recognizing the target object in the scene based on the depth data ZDATA (S400). The result of the determination may be provided to the data extraction unit 375 as the coordinates (x, y) of the center point and the size (Lx, Ly) of the motion tracking region MTR as described with reference to FIG. 9.

The data extraction unit 375 may include a first data extractor (EXTR1) 376 and a second data extractor (EXTR2) 377. The first data extractor 376 may extract region depth data of the first resolution RES1 corresponding to the motion tracking region MTR from the depth data ZDATA of the first resolution RES1 corresponding to the frame (S632). The second data extractor 377 may extract region image data of the second resolution RES2 corresponding to the motion tracking region MTR from the two-dimensional data BWDATA of the second resolution RES2 corresponding to the frame (S634).

The image enhancer 385 may compensate for the region depth data of the first resolution RES1 using the region image data of the second resolution RES2 to generate region depth data of the second resolution RES2 (S636), and provide the region depth data of the second resolution RES2 as the tracking region data TRDATA (S638). For example, the image enhancer 385 may extract information of edges or textures from the region image data of the second resolution RES2, and compensate for the region depth data of the first resolution RES1 using the edge and/or textures information to generate the region depth data of the second resolution RES2.

As such, the target object may be discerned using the depth data ZDATA of the lower first resolution RES1, then the kind, the shape, and/or the motion of the target object may be analyzed using the tracking region data TRDATA of the higher second resolution RES2, and thus the motion of the target object may be better recognized.

Using only a depth sensor without a two-dimensional or three-dimensional image sensor, the depth data ZDATA of the lower first resolution RES1 and the two-dimensional data BWDATA of the higher second resolution RES2 may be obtained, and the above-mentioned local super-resolution may be performed such that the lower-resolution depth data may be enhanced using the two-dimension data of the higher resolution, with respect to only a portion of an entire frame.

FIG. 23 is a diagram illustrating an example of a pixel array included in a depth sensor.

Referring to FIG. 23, the pixel array PX_Z includes a plurality of depth pixels Z1, Z2, Z3, and Z4. The depth pixels Z1, Z2, Z3, and Z4 may be the time-of-flight (TOF) depth pixels that operate in response to a plurality of demodulation signals having different phases from each other. For example, the depth pixel Z1 may operate in response to the demodulation signal having phase difference of 0 degrees with respect to the transmission light TL radiated from the image capturing device 100 of FIG. 4. In other words, the depth pixel Z1 may operate in response to the demodulation signal having the same phase with the transmission light TL. The depth pixel Z2 may operate in response to the demodulation signal having phase difference of 90 degrees with respect to the transmission light TL, the depth pixel Z3 may operate in response to the demodulation signal having phase difference of 180 degrees with respect to the transmission light TL, and the depth pixel Z4 may operate in response to the demodulation signal having phase difference of 270 degrees with respect to the transmission light TL. For example, the pixel pattern 103 including the depth pixels Z1, Z2, Z3, and Z4, which operate respectively in response to the demodulation signals of the different phases, may be repeatedly arranged in the pixel array PX_Z.

Figure 24:
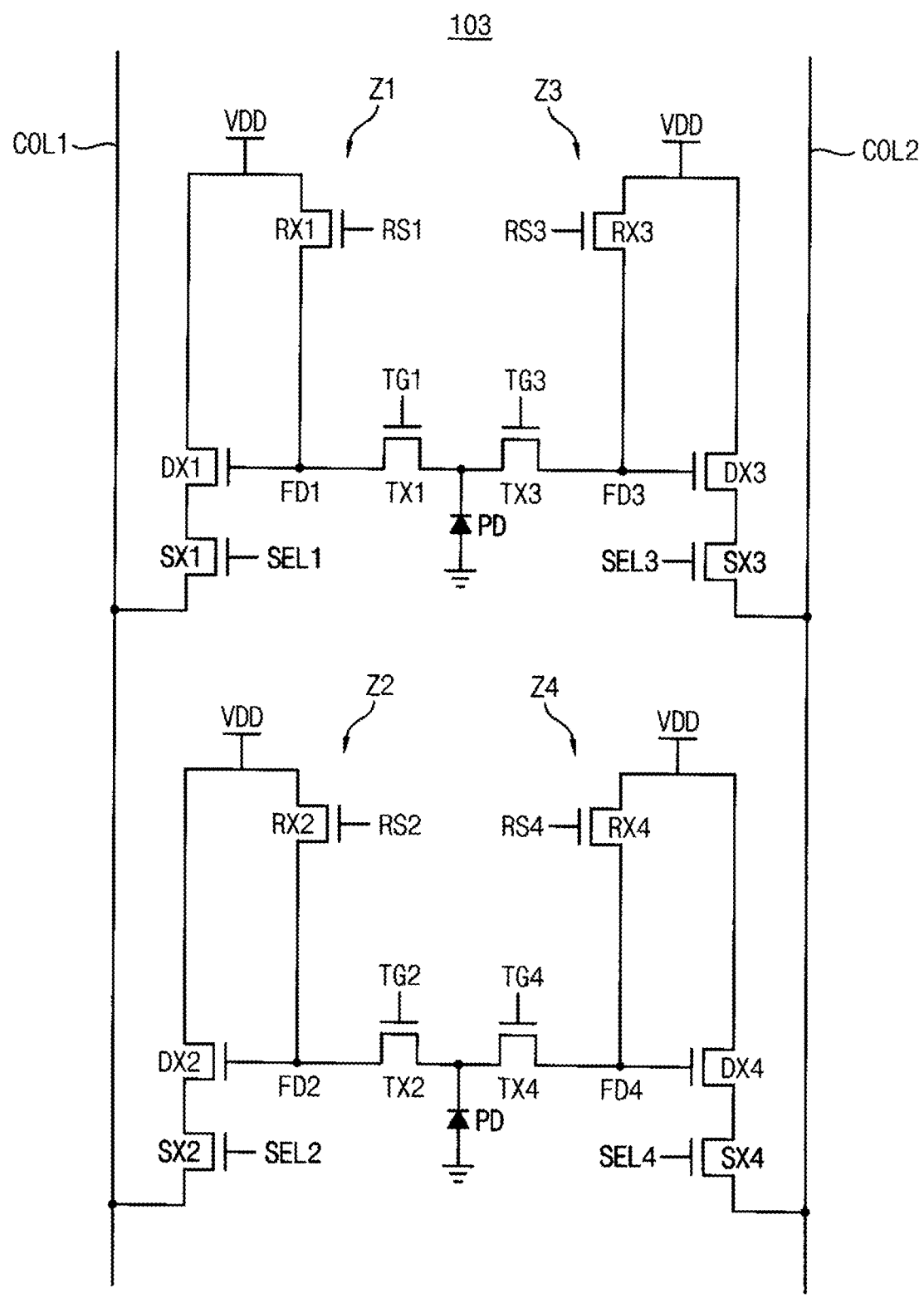
FIG. 24 is a circuit diagram illustrating example time-of-flight (TOF) depth pixels in the pixel array of FIG. 23.

FIG. 24 is a circuit diagram illustrating example time-of-flight (TOF) depth pixels in the pixel array of FIG. 23. FIG. 24 illustrates the one pixel pattern 103 in the pixel array PX_Z in FIG. 23.

Compared with the unit pixels of a single-tap structure in FIGS. 12A, 12B, 12C, and 12D, first through fourth pixels Z1, Z2, Z3, and Z4 in FIG. 24 have a two-tap structure for measuring the distance according to the TOF scheme.

Referring to FIG. 24, the first and third pixels Z1 and Z3 may share a photo-sensitive element such as a photodiode PD. The first pixel Z1 may include a first readout circuit including a first transfer transistor TX1, a first reset transistor RX1, a first drive transistor DX1, and a first selection transistor SX1. The third pixel Z3 may include a third readout circuit including a third transfer transistor TX3, a third reset transistor RX3, a third drive transistor DX3, and a third selection transistor SX3. In the same way, the second and fourth pixels Z2 and Z4 may share a photo-sensitive element such as a photodiode PD. The second pixel Z2 may include a second readout circuit including a second transfer transistor TX2, a second reset transistor RX2, a second drive transistor DX2, and a second selection transistor SX2. The fourth pixel Z4 may include a fourth readout circuit including a fourth transfer transistor TX4, a fourth reset transistor RX4, a fourth drive transistor DX4, and a fourth selection transistor SX4.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 200e illustrated in FIG. 24 may include a photo transistor, a photo gate, a pinned photo diode, etc. instead of or in addition to the photodiode PD.

The photo-charge generated in the photodiodes PD may be transferred to floating diffusion nodes FD1, FD2, FD3, and FD4 through the transfer transistors TX1, TX2, TX3, and TX4, respectively. The transfer control signals TG1, TG2, TG3, and TG4 may be the above-described demodulation signals having the phase difference of 0, 90, 180, and 270 degrees, respectively, with respect to the transmission light TL. As such, the photo charge generated in the photodiodes PD may be divided in response to the demodulation signals TG1, TG2, TG3, and TG4 to determine the roundtrip TOF of the light and the distance to the object may be calculated based on the roundtrip TOF.

The drive transistors DX1, DX2, DX3, and DX4 function as source follower amplifiers that amplify signals corresponding to the respective charges on the floating diffusion nodes FD1, FD2, FD3, and FD4. The selection transistors SX1, SX2, SX3, and SX4 may transfer the amplified signals to the column lines COL1 and COL2 in response to the selection signals SEL1, SEL2, SEL3, and SEL4, respectively. The floating diffusion nodes FD1, FD2, FD3, and FD4 may be reset by the reset transistors RX1, RX2, RX3, and RX4, respectively. For example, the reset transistors RX1, RX2, RX3, and RX4 may discharge the floating diffusion nodes FD1, FD2, FD3, and FD4 in response to reset signals RS1, RS2, RS3, and RS4, respectively, for correlated double sampling (CDS).

FIG. 24 illustrates the non-limiting example of the depth pixels of the two-tap configuration, and the depth pixels may have various configurations such as a single-tap configuration, four-tap configuration, etc. The timing of the control signals may be determined properly depending on the configuration of the depth pixels.

Figure 25:
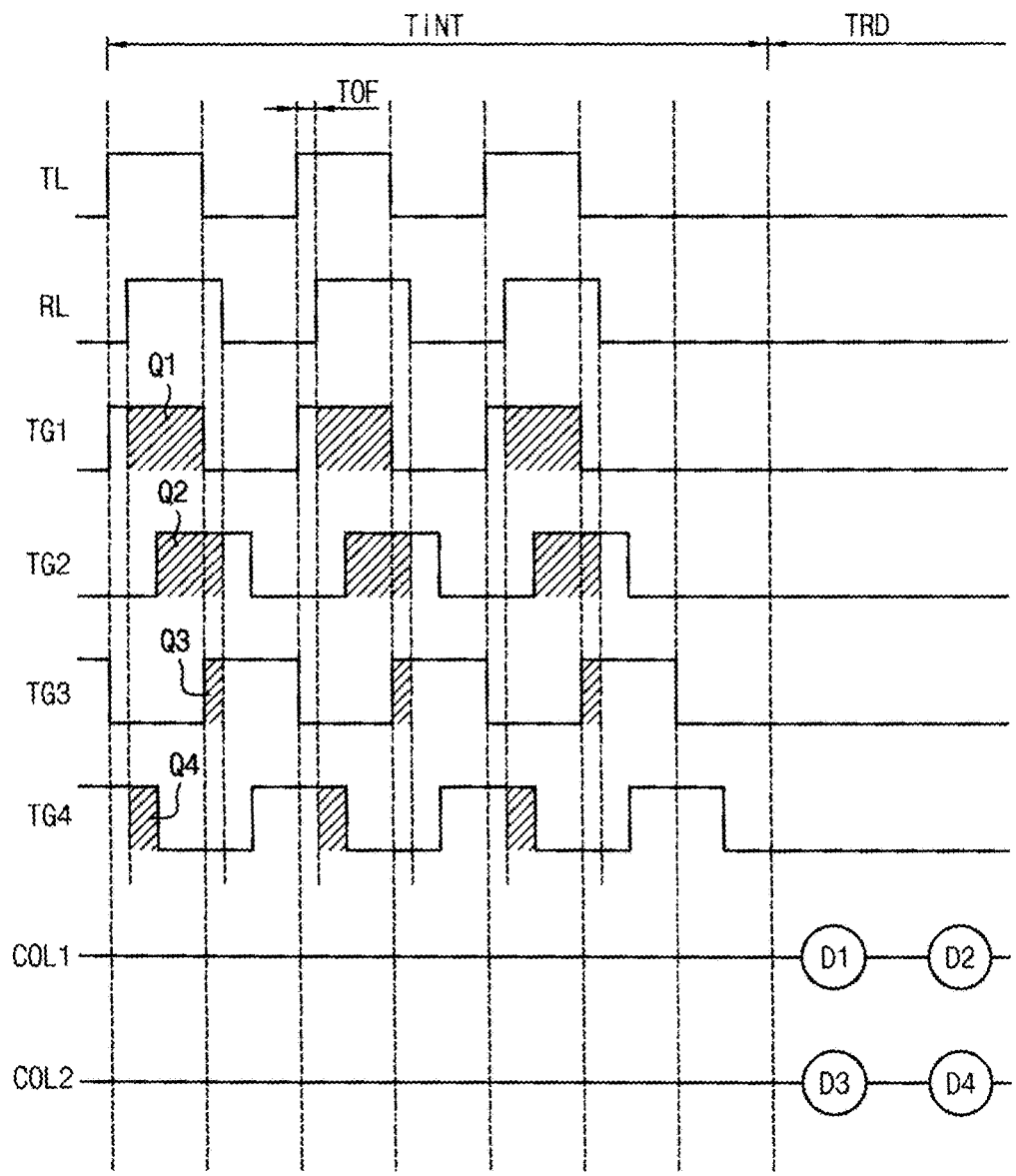
FIG. 25 is a timing diagram illustrating an operation of the TOF pixels of FIG. 24.

FIG. 25 is a timing diagram illustrating an operation of the TOF pixels of FIG. 24.

Referring to FIG. 25, an object is illuminated with a modulated transmission light TL during an integration time interval TINT. As described with reference to FIG. 4, the image capturing device 100 may include a light source 110 or a light-emitting device to generate the modulated transmission light TL having periodically varying intensity. For example, the image capturing device 100 may repeat the transmission and non-transmission of the modulated transmission light TL by turning on or off the light-emitting device at a frequency ranging from about 10 MHz to about 200 MHz. Even though FIG. 25 illustrates the modulated transmission light TL of a pulse train, an arbitrary periodic light signal such as a sinusoidal signal may be used as the modulated transmission light TL and the demodulation signals TG1, TG2, TG3, and TG4.

The modulated transmission light TL is reflected by the object and returned to the image capturing device 100 as a reception light RL. The reception light RL is delayed by a time-of-flight (TOF) with respect to the modulated transmission light TL. The photo-charge is generated in the photo-detection region of the depth pixel by the reception light RL.

The demodulation signals TG1, TG2, TG3, and TG4 may have a given, desired, or predetermined phases with respect to the modulated transmission light TL. If the photo-charges Q1, Q2, Q3, and Q4 integrated during the activation interval of the demodulation signals TG1, TG2, TG3, and TG4 are obtained, the TOF may be calculated based on the photo-charges Q1, Q2, Q3, and Q4.

When the distance from the photo-sensing device to the object is 'D' and a light velocity is 'c', the distance may be calculated using the relation D=(TOF*c)/2. Even though FIG. 25 illustrates the four demodulation signals TG1, TG2, TG3, and TG4 having the different phases, a different combination of the demodulation signals may be used to obtain the TOF. For example, the image capturing device 100 may use only the first demodulation signal TG1 having a phase equal to a phase of the modulated transmission light TL and a third demodulation signal TG3 having a phase opposite to the phase of the modulated transmission light TL. Even though not illustrated in FIG. 25, the photo-detection regions PD and the floating diffusion regions FD may be initialized by activating the reset signal RS, etc. before the integration time interval TINT.

During a readout time interval TRD, the data bits D1, D2, D3, and D4 corresponding to the integrated photo-charges Q1, Q2, Q3, and Q4 are provided through column lines COL1 and COL2. The data bits D1, D2, D3, and D4 may be output as the above-described raw data RZDATA and used in calculating the depth data ZDATA and/or the two-dimensional data CDATA.

Figure 26:
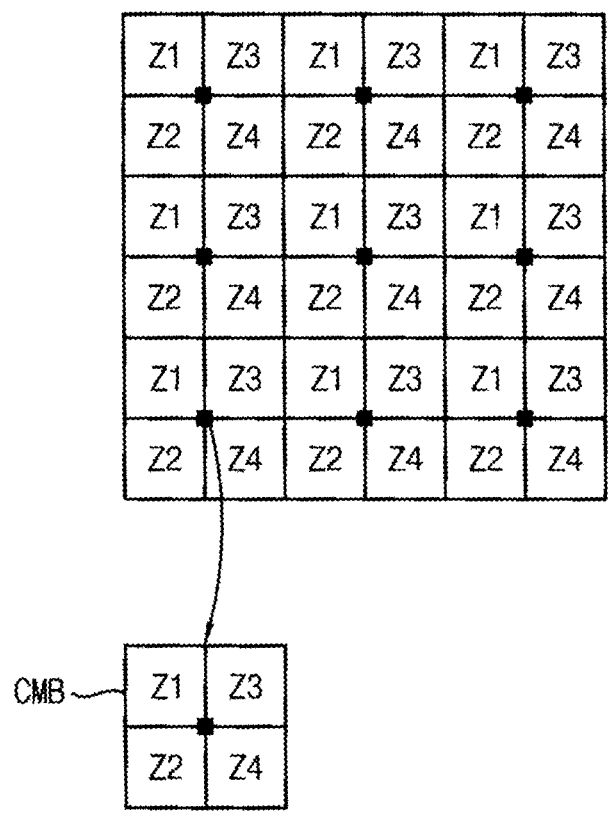
FIG. 26 is a diagram illustrating an example combination for providing depth data.

FIG. 26 is a diagram illustrating an example combination for providing depth data.

Referring to FIG. 26, one bit value of the depth data ZDATA may be provided based on four bit values of the raw data RZDATA, where the four bit values respectively correspond to the four demodulation signals TG1, TG2, TG3, and TG4 having the phase difference of 0, 90, 180, and 270 degrees, respectively, with respect to the transmission light TL. In other words, each combination CMB including the four depth pixels Z1, Z2, Z3, and Z4 may provide the one bit value of the depth data ZDATA.

As described above, the one bit value of the depth data ZDATA may be obtained by calculating the TOF based on the photo-charges Q1, Q2, Q3, and Q4 respectively corresponding to the demodulation signals TG1, TG2, TG3, and TG4 having the phase differences of 0, 90, 180, and 270 degrees. In FIG. 26, the small solid rectangular points are illustrated to indicate the positions corresponding to the bits of the calculated depth data ZDATA. When the depth pixels are arranged in a matrix form with the resolution of 2X*2Y, the above-described first resolution RES1, i.e., the resolution of the depth data ZDATA may be X*Y.

Figure 27:
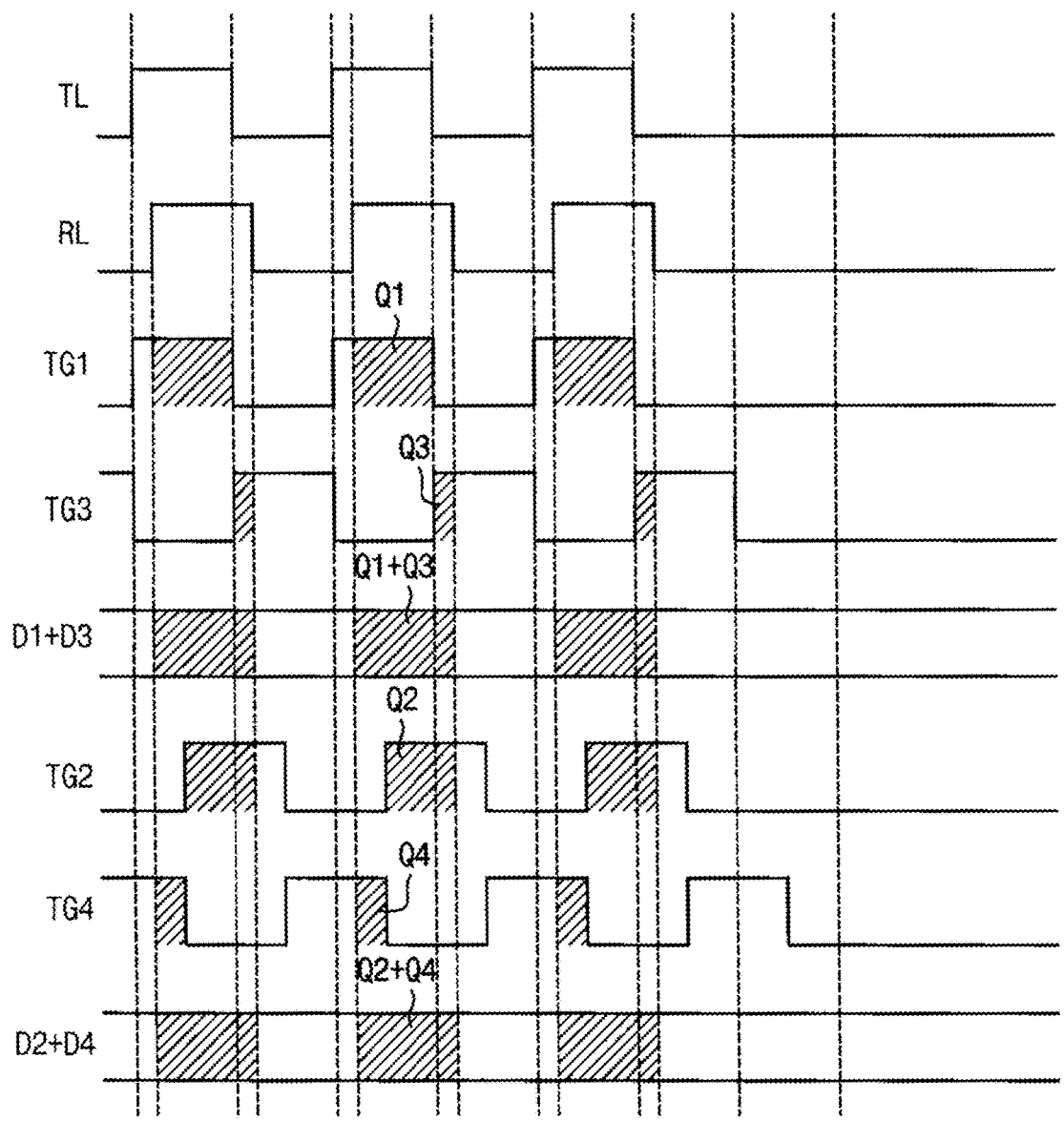
FIG. 27 is a diagram for describing a method of calculating two-dimensional data based on raw data obtained using depth pixels.

FIG. 27 is a diagram for describing a method of calculating two-dimensional data based on raw data obtained using depth pixels.

Referring to FIG. 27, one bit value of the two-dimensional data BWDATA may be obtained by summing two bit values corresponding to the two demodulation signals having the opposite phases among the four bit values D1, D2, D3, and D4 of the raw data RZDATA. One bit value D1+D3 of the two-dimensional data BWDATA may be obtained by summing two bit values D1 and D3 of the raw data RZDATA, where the two bit values D1 and D3 respectively correspond to the two demodulation signals GT1 and GT3 having the phase differences of 0 and 180 degrees, among the four bit values D1, D2, D3, and D4 of the raw data RZDATA. In addition, another bit value D2+D4 of the two-dimensional data BWDATA may be obtained by summing other two bit values D2 and D4 of the raw data RZDATA, where the other two bit values D2 and D4 respectively correspond to the two demodulation signals GT2 and GT4 having the phase differences of 90 and 270 degrees, among the four bit values D1, D2, D3, and D4 of the raw data RZDATA. As such, by summing the two bit values of the raw data RZDATA corresponding to the two demodulation signals having the opposite phases, the calculated two-dimensional data BWDATA may represent the black and white image.

Figure 28A:
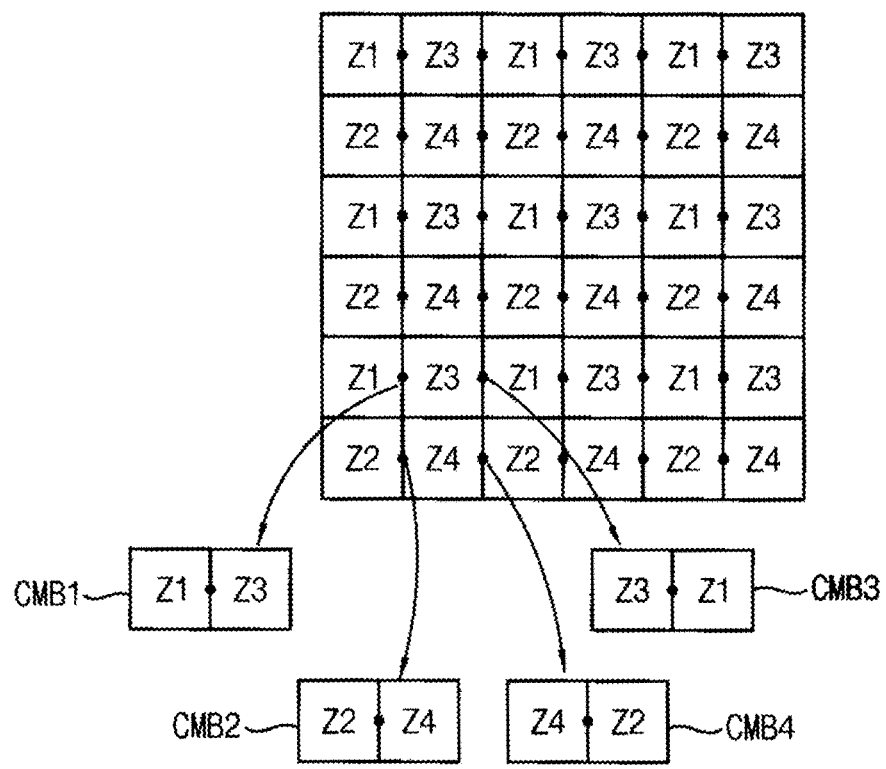
FIGS. 28A and 28B are diagrams example combinations for providing two-dimensional data.
Figure 28B:
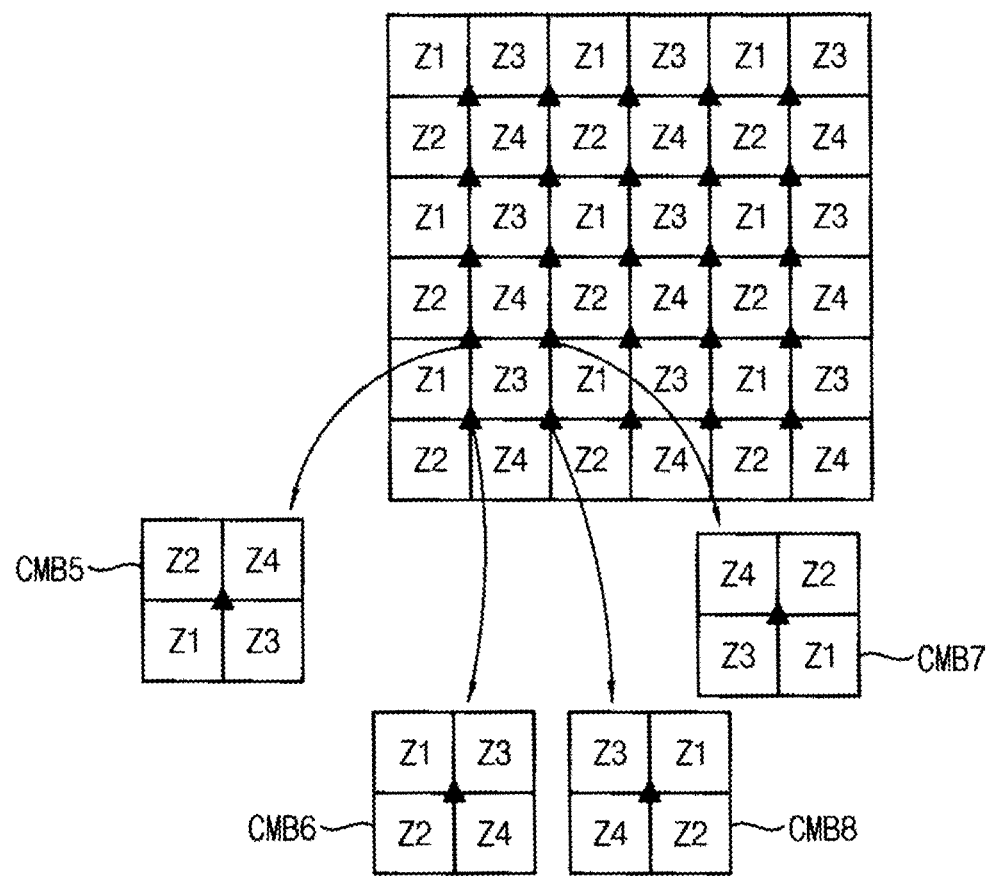

FIGS. 28A and 28B are diagrams example combinations for providing two-dimensional data.

As described with reference to FIG. 27, each bit value of the two-dimensional data BWDATA may be provided by summing the two bit values of the raw data RZDATA.

Referring to FIG. 28A, according to the combinations CMB1 and CMB3, the one bit value of the two-dimensional data BWDATA may be provided by summing the two bit values from the two pixels Z1 and Z3 corresponding to the demodulation signals GT1 and GT3 having the phase differences of 0 and 180 degrees with respect to the transmission light TL. In addition, according to the combinations CMB2 and CMB4, the one bit value of the two-dimensional data BWDATA may be provided by summing the two bit values from the two pixels Z2 and Z4 corresponding to the demodulation signals GT2 and GT4 having the phase differences of 90 and 270 degrees with respect to the transmission light TL.

In FIG. 28A, the small solid circular points are illustrated to indicate the positions corresponding to the bits of the calculated two-dimensional data BWDATA. When the depth pixels are arranged in a matrix form with the resolution of 2X*2Y, the above-described second resolution RES2, i.e., the resolution of the two-dimensional data BWDATA may be 2X*(2Y−1).

Referring to FIG. 28B, according to the combinations CMB5, CMB6, CMB7, and CMB8, the one bit value of the two-dimensional data BWDATA may be provided by summing the four bit values from the four pixels Z1, Z2, Z3, and Z4 corresponding to the demodulation signals GT1, GT2, GT3, and GT4 having the phase differences of 0, 90, 180, and 270 degrees with respect to the transmission light TL.

In FIG. 28B, the small solid triangular points are illustrated to indicate the positions corresponding to the bits of the calculated two-dimensional data BWDATA. When the depth pixels are arranged in a matrix form with the resolution of 2X*2Y, the above-described second resolution RES2, i.e., the resolution of the two-dimensional data BWDATA may be (2X−1)*(2Y−1).

The depth data ZDATA of the lower first resolution RES1 (e.g., X*Y) may be provided by combining M bits (e.g., four bits) of the raw data RZDATA as described with reference to FIG. 27, and the two-dimensional data BWDATA of the higher second resolution RES2 (e.g., 2X*(2Y−1) or (2X−1)*(2Y−1)) may be provided by combining N bits (e.g., two bits or four bits) of the raw data RZDATA as described with reference to FIGS. 28A and 28B.

As such, the depth data ZDATA and the two-dimensional data BWDATA may be obtained using only the depth sensor without the two-dimensional image sensor, and the above-mentioned local super-resolution may be performed using the obtained data ZDATA and BWDATA.

Figure 29:
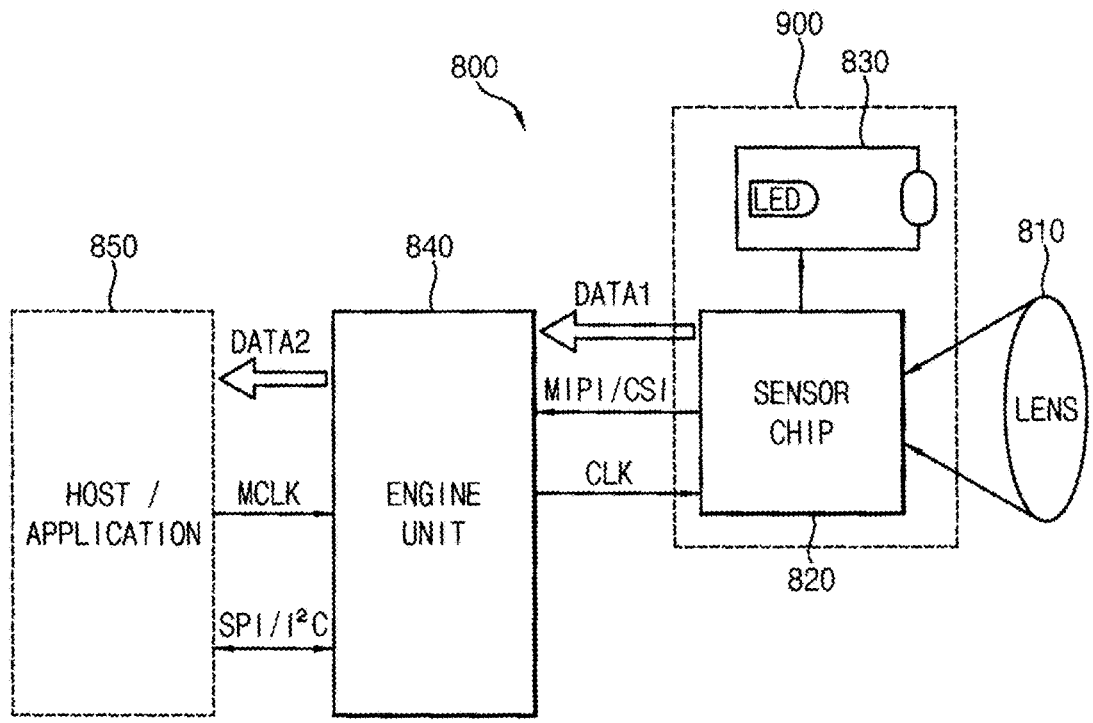
FIG. 29 illustrates a block diagram of a camera including a three-dimensional image sensor according to some example embodiments of the inventive concept.

FIG. 29 illustrates a block diagram of a camera including a three-dimensional image sensor according to some example embodiments of the inventive concept.

Referring to FIG. 29, a camera 800 includes a photo-receiving lens 810, a three-dimensional image sensor 900, and an engine unit 840. The three-dimensional image sensor 900 may include a three-dimensional image sensor chip 820 and a light source module 830. According to some example embodiments, the three-dimensional image sensor chip 820 and the light source module 830 may be implemented with separated devices, or at least a portion of the light source module 830 may be included in the three-dimensional image sensor chip 820. In some example embodiments, the photo-receiving lens 810 may be included in the three-dimensional image sensor chip 820.

The photo-receiving lens 810 may focus incident light on a photo-receiving region (e.g., depth pixels and/or color pixels included in a pixel array) of the three-dimensional image sensor chip 820. The three-dimensional image sensor chip 820 may generate data DATA1 including depth information and/or color image information based on the incident light passing through the photo-receiving lens 810. For example, the data DATA1 generated by the three-dimensional image sensor chip 820 may include depth data generated using infrared light or near-infrared light emitted from the light source module 830 and red, green, blue (RGB) data of a Bayer pattern generated using external visible light. The three-dimensional image sensor chip 820 may provide the data DATA1 to the engine unit 840 based on a clock signal CLK. In some example embodiments, the three-dimensional image sensor chip 820 may interface with the engine unit 840 via mobile industry processor interface (MIPI®) and/or camera serial interface (CSI).

The engine unit 840 controls the three-dimensional image sensor 900. The engine unit 840 may process the data DATA1 received from the three-dimensional image sensor chip 820. To perform the above-described method of recognizing the motion according to some example embodiments, the engine unit 840 may include motion region tracker 300 and/or the motion analyzer 500. The engine unit 840 may perform data processing in addition to the motion recognition. For example, the engine unit 840 may generate three-dimensional color data based on the data DATA1 received from the three-dimensional image sensor chip 820. In other examples, the engine unit 840 may generate luminance, chrominance (YUV) data including a luminance component Y, a blue-luminance difference component U, and a red-luminance difference component V based on the RGB data included in the data DATA1, or compressed data, such as Joint Photographic Experts Group (JPEG) data. The engine unit 840 may be connected to a host/application 850 and may provide data DATA2 to the host/application 850 based on a master clock MCLK. Further, the engine unit 840 may interface with the host/application 850 via serial peripheral interface (SPI) and/or inter integrated circuit (I2C).

Figure 30:
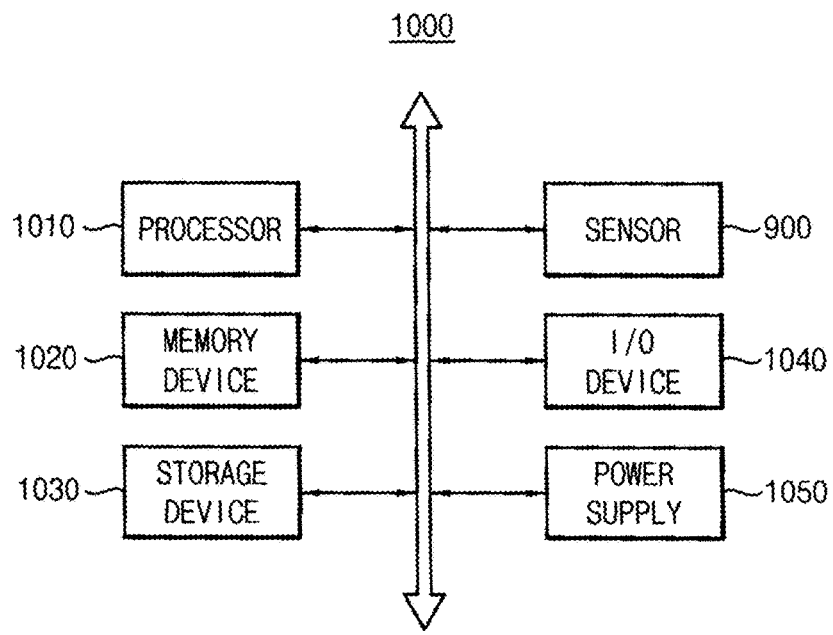
FIG. 30 illustrates a block diagram of a computer system including a motion recognizing device according to some example embodiments of the inventive concept.

FIG. 30 illustrates a block diagram of a computer system including a motion recognizing device according to some example embodiments of the inventive concept.

Referring to FIG. 30, a computing system 1000 may include a processor 1010, a memory device 1020, a storage device 1030, an input/output device 1040, a power supply 1050, and a three-dimensional image sensor 900. Although it is not illustrated in FIG. 30, the computing system 1000 may further include ports that communicate with a video card, a sound card, a memory card, a universal serial bus (USB) device, and/or other electronic devices.

The processor 1010 may perform various calculations or tasks. According to some embodiments, the processor 1010 may be a microprocessor or a central processing unit (CPU). The processor 1010 may communicate with the memory device 1020, the storage device 1030, and the input/output device 1040 via an address bus, a control bus, and/or a data bus. In some example embodiments, the processor 1010 may be coupled to an extended bus, such as a peripheral component interconnection (PCI) bus. The memory device 1020 may store data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device may include a solid state drive (SSD), a hard disk drive (HDD), a compact-disc read-only memory (CD-ROM), etc. The input/output device 1040 may include an input device (e.g., a keyboard, a keypad, a mouse, etc.) and an output device (e.g., a printer, a display device, etc.). The power supply 1050 supplies operation voltages for the computing system 1000.

The three-dimensional image sensor 900 may communicate with the processor 1010 via the buses or other communication links. The three-dimensional image sensor 900 may be integrated with the processor 1010 in one chip, or the three-dimensional image sensor 900 and the processor 1010 may be implemented as separate chips.

The three-dimensional image sensor 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The computing system 1000 may be any computing system using a three-dimensional image sensor. For example, the computing system 1000 may include a digital camera, a mobile phone, a smart phone, a portable multimedia player (PMP), a personal digital assistant (PDA), etc.

FIG. 31 illustrates a block diagram of an interface employable in the computing system of FIG. 30 according to some example embodiments of the inventive concept.

Referring to FIG. 31, a computing system 1100 may be implemented by a data processing device that uses or supports a mobile industry processor interface (MIPI®) interface. The computing system 1100 may include an application processor 1110, a three-dimensional image sensor 1140, a display device 1150, etc. A CSI host 1112 of the application processor 1110 may perform a serial communication with a CSI device 1141 of the three-dimensional image sensor 1140 via a camera serial interface (CSI). In some example embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI).

In some example embodiments, the DSI host 1111 may include a serializer (SER), and the DSI device 1151 may include a deserializer (DES). The computing system 1100 may further include a radio frequency (RF) chip 1160 performing a communication with the application processor 1110 and a DigRF$^{SM}$ slave 1162 providing communication with other devices. A physical layer (PHY) 1113 of the computing system 1100 and a physical layer (PHY) 1161 of the RF chip 1160 may perform data communications based on a MIPI® DigRF$^{SM}$. The application processor 1110 may further include a DigRF$^{SM}$ MASTER 1114 that controls the data communications of the PHY 1161.

The computing system 1100 may further include a global positioning system (GPS) 1120, a storage 1170, a MIC 1180, a DRAM device 1185, and a speaker 1190. In addition, the computing system 1100 may perform communications using an ultra-wideband (UWB) 1210, a wireless local area network (WLAN) 1220, a worldwide interoperability for microwave access (WIMAX) 1230, etc. However, the structure and the interface of the computing system 1100 are not limited thereto.

Some example embodiments of the inventive concept may be applied to arbitrary devices and/or systems that require rapid and/or improved motion recognition for the moving object. Particularly, some example embodiments of the inventive concept may be applied usefully to the devices and/or systems requiring a user interface based on the motion of the user.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of recognizing motion of an object, the method comprising:
   periodically obtaining depth data of a first resolution and two-dimensional data of a second resolution with respect to a scene using an image capturing device, wherein the second resolution is higher than the first resolution;
   determining a motion tracking region by recognizing a target object in the scene based on the depth data, such that the motion tracking region corresponds to a portion of a frame and the portion includes the target object;
   periodically obtaining tracking region data of the second resolution corresponding to the motion tracking region; and
   analyzing motion of the target object based on the tracking region data,
   wherein the periodically obtaining the tracking region data of the second resolution includes, extracting region depth data of the first resolution corresponding to the motion tracking region from the depth data of the first resolution corresponding to the frame;

extracting region image data of the second resolution corresponding to the motion tracking region from the two-dimensional data of the second resolution corresponding to the frame;

compensating for the region depth data of the first resolution using the region image data of the second resolution to generate region depth data of the second resolution; and providing the region depth data of the second resolution as the tracking region data.

2. The method of claim 1, wherein periodically obtaining the depth data and the two-dimensional data includes:

periodically providing the depth data corresponding to the frame using time-of-flight (TOF) depth pixels, the TOF depth pixels operating in response to a plurality of demodulation signals having different phases from each other.

3. The method of claim 1, wherein determining the motion tracking region within the scene includes:

determining coordinates of a center point of the motion tracking region within the scene in the frame; and determining a size of the motion tracking region within the scene in the frame.

4. The method of claim 1, wherein periodically obtaining the depth data and the two-dimensional data includes:

providing the depth data corresponding to the frame with a first frame period using depth pixels of the first resolution; and providing the two-dimensional data corresponding to the frame with a second frame period using color pixels of the second resolution.

5. The method of claim 4, further comprising:

synchronizing the depth data and the two-dimensional data to be matched with each other, when the first frame period is different from the second frame period.

6. A method of recognizing motion of an object, the method comprising:

arranging depth pixels and color pixels in a common pixel array;

periodically obtaining depth data of a first resolution and two-dimensional data of a second resolution with respect to a scene using the depth pixels and the color pixels, wherein the second resolution is higher than the first resolution;

determining a motion tracking region by recognizing a target object in the scene based on the depth data, such that the motion tracking region corresponds to a portion of a frame and the portion includes the target object;

periodically obtaining tracking region data of the second resolution corresponding to the motion tracking region; and analyzing motion of the target object based on the tracking region data.

7. The method of claim 6, wherein the depth pixels correspond to time-of-flight (TOF) depth pixels, the TOF depth pixels operating in response to a plurality of demodulation signals having different phases from each other.

8. The method of claim 7, wherein one bit value of the depth data is provided based on M bit values of the raw data and one bit value of the two-dimensional data is provided based on N bit values of the raw data, where M is a natural number and N is a natural number smaller than N.

9. The method of claim 7, wherein periodically obtaining the depth data and the two-dimensional data includes:

periodically providing raw data corresponding to the frame using the TOF depth pixels; and calculating the depth data of the first resolution and the two-dimensional data of the second resolution based on the raw data.

10. The method of claim 9, wherein calculating the depth data of the first resolution and the two-dimensional data of the second resolution includes:

providing the depth data of the first resolution by combining every M bits of the raw data, where M is a positive integer equal to or greater than two; and providing the two-dimensional data of the second resolution by combining every N bits of the raw data, where N is a positive integer equal to or smaller than M.

11. The method of claim 9, wherein, the depth pixels and color pixels are included in an image capturing device, and the demodulation signals have phase differences of 0, 90, 180 and 270 degrees, respectively, with respect to transmission light radiated from the image capturing device.

12. The method of claim 11, wherein providing the depth data of the first resolution includes:

providing one bit value of the depth data based on four bit values of the raw data, the four bit values respectively corresponding to the four demodulation signals having the phase differences of 0, 90, 180 and 270 degrees, respectively.

13. The method of claim 11, wherein providing the two-dimensional data of the second resolution includes:

providing one bit value of the two-dimensional data by summing two bit values of the raw data, the two bit values respectively corresponding to the two demodulation signals having the phase differences of 0 and 180 degrees; and providing another bit value of the two-dimensional data by summing other two bit values of the raw data, the other two bit values respectively corresponding to the two demodulation signals having the phase differences of 90 and 270 degrees.

14. The method of claim 6, wherein periodically obtaining the tracking region data of the second resolution includes:

extracting region image data of the second resolution corresponding to the motion tracking region within the scene from the two-dimensional data of the second resolution corresponding to the frame; and providing the region image data of the second resolution as the tracking region data.

15. The method of claim 6, wherein periodically obtaining the tracking region data of the second resolution includes:

extracting region depth data of the first resolution corresponding to the motion tracking region within the scene from the depth data of the first resolution corresponding to the frame;

extracting region image data of the second resolution corresponding to the motion tracking region within the scene from the two-dimensional data of the second resolution corresponding to the frame;

compensating for the region depth data of the first resolution using the region image data of the second resolution to generate region depth data of the second resolution; and providing the region depth data of the second resolution as the tracking region data.

16. An apparatus for recognizing motion of an object, the apparatus comprising:
- an image capturing device configured to periodically provide depth data of a first resolution and two-dimensional data of a second resolution with respect to a scene, wherein the second resolution is higher than the first resolution;
- a motion region tracker configured to determine a motion tracking region within the scene by recognizing a target object in the scene based on the depth data, such that the motion tracking region within the scene corresponds to a portion of a frame and the portion includes the target object, and configured to periodically provide tracking region data of the second resolution corresponding to the motion tracking region within the scene; and
- a motion analyzer configured to analyze motion of the target object based on the tracking region data,
- wherein the image capturing device includes:
- a pixel array in which time-of-flight (TOF) depth pixels of the first resolution and color pixels of the second resolution are alternatively arranged, the TOF depth pixels operating in response to a plurality of demodulation signals having different phases from each other to periodically provide raw data corresponding to the frame.

17. The apparatus of claim 16, wherein the demodulation signals have phase differences of 0, 90, 180, and 270 degrees, respectively, with respect to transmission light radiated from the image capturing device, and one bit value of the depth data is provided based on four bit values of the raw data, the four bit values respectively corresponding to the four demodulation signals having the phase differences of 0, 90, 180, and 270 degrees, respectively.

18. The apparatus of claim 16, wherein the image capturing device further includes:
- a color pixel select circuit and a color pixel converter configured to provide the two-dimensional data by controlling the color pixels; and
- a depth pixel select circuit and a depth pixel converter configured to provide the depth pixel by controlling the TOF depth pixels.

19. The apparatus of claim 16, wherein the motion region tracker is configured to:
- extract region image data of the second resolution corresponding to the motion tracking region within the scene from the two-dimensional data of the second resolution corresponding to the frame; and
- provide the region image data of the second resolution as the tracking region data.

20. The apparatus of claim 16, wherein the motion region tracker is configured to:
- extract region depth data of the first resolution corresponding to the motion tracking region within the scene from the depth data of the first resolution corresponding to the frame;
- extract region image data of the second resolution corresponding to the motion tracking region within the scene from the two-dimensional data of the second resolution corresponding to the frame;
- compensate for the region depth data of the first resolution using the region image data of the second resolution to generate region depth data of the second resolution; and
- provide the region depth data of the second resolution as the tracking region data.

* * * * *